United States Patent
Yamagata et al.

(10) Patent No.: US 11,499,357 B2
(45) Date of Patent: Nov. 15, 2022

(54) DOOR OPENING AND CLOSING DEVICE FOR VEHICLES

(71) Applicant: U-Shin Ltd., Tokyo (JP)

(72) Inventors: Mikio Yamagata, Hiroshima (JP); Motoharu Amano, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 321 days.

(21) Appl. No.: 16/650,144

(22) PCT Filed: Oct. 30, 2018

(86) PCT No.: PCT/JP2018/040313
§ 371 (c)(1),
(2) Date: Mar. 24, 2020

(87) PCT Pub. No.: WO2019/093195
PCT Pub. Date: May 16, 2019

(65) Prior Publication Data
US 2020/0277816 A1    Sep. 3, 2020

(30) Foreign Application Priority Data

Nov. 7, 2017  (JP) .............................. JP2017-214843
Nov. 7, 2017  (JP) .............................. JP2017-214844
Sep. 28, 2018 (JP) .............................. JP2018-184334

(51) Int. Cl.
*F16H 25/00*   (2006.01)
*E05F 15/622*  (2015.01)
*B60J 5/10*    (2006.01)
*F16H 25/24*   (2006.01)
*F16H 25/20*   (2006.01)

(52) U.S. Cl.
CPC ............. *E05F 15/622* (2015.01); *B60J 5/106* (2013.01); *F16H 25/24* (2013.01);
(Continued)

(58) Field of Classification Search
CPC ......... E05F 15/622; B60J 5/106; F16H 25/24; F16H 2025/204; E05Y 2900/531; E05Y 2900/546
See application file for complete search history.

(56) References Cited

U.S. PATENT DOCUMENTS 7,681,469 B2 *  3/2010  Ritter .................... E05F 15/622
                                                  74/89.23
2007/0062119 A1 * 3/2007 Ritter ...................... F16H 25/20
                                                    49/343
(Continued)

FOREIGN PATENT DOCUMENTS

DE   20 2005 007 154      10/2006
DE   102007054448 B3 *   3/2009 ............ E05F 1/1091
(Continued)

OTHER PUBLICATIONS

International Search Report dated Dec. 18, 2018 in International (PCT) Application No. PCT/JP2018/040313.
(Continued)

*Primary Examiner* — Zakaria Elahmadi
(74) *Attorney, Agent, or Firm* — Wenderoth, Lind & Ponack, LLP

(57) ABSTRACT

A door opening and closing device for vehicles of the present invention includes: a motor drive mechanism; a first housing that accommodates the motor drive mechanism; a spindle drive mechanism connected to the motor drive mechanism; and a second housing that is arranged coaxially with the first housing and relatively moves with respect to the first housing by the spindle drive mechanism. The spindle drive mechanism includes: a spindle connected to the motor drive mechanism; a spindle nut screwed with the spindle; a push rod fixed so as not to rotate relative to the spindle nut and provided with a protrusion on its outer
(Continued)

periphery; and a guide tube in which a guide groove guiding the protrusion of the push rod in an axial direction is formed.

10 Claims, 24 Drawing Sheets

(52) U.S. Cl.
CPC ... *E05Y 2900/531* (2013.01); *E05Y 2900/546* (2013.01); *F16H 2025/204* (2013.01)

(56) References Cited

U.S. PATENT DOCUMENTS

2015/0336476 A1* 11/2015 Bosecker ............ F16H 25/2472
74/89.23

2016/0153532 A1* 6/2016 Fischer ................. E05F 15/611
74/89.35
2017/0362876 A1* 12/2017 Ishikawa .................. H02K 5/10

FOREIGN PATENT DOCUMENTS

| JP | 11-264451  | 9/1999 |
| JP | 4430044    | 3/2010 |
| JP | 2016-513778 | 5/2016 |
| JP | 2017-20598  | 1/2017 |
| JP | 2017-20600  | 1/2017 |

OTHER PUBLICATIONS

Office Action dated Aug. 18, 2022 in corresponding German Patent Application No. 112018005302.4, with English translation.

* cited by examiner

DOOR OPENING AND CLOSING DEVICE FOR VEHICLES

CROSS-REFERENCE TO RELATED APPLICATIONS

This is a national phase application in the United States of International Patent Application No. PCT/JP2018/040313 with an international filing date of Oct. 30, 2018, which claims priorities of Japanese Patent Applications No. 2017-214843 filed on Nov. 7, 2017, No. 2017-214844 filed on Nov. 7, 2017, and No. 2018-184334 filed on Sep. 28, 2018.

TECHNICAL FIELD

The present invention relates to a door opening and closing device for vehicles.

BACKGROUND ART

A drive device disclosed in JP 4430044 B includes a housing tube and a cover tube that slidably guides the housing tube. The housing tube includes: a spindle drive having a threaded spindle and a spindle nut arranged on the threaded spindle; and a rotary drive that can drive the spindle drive in rotation. The threaded spindle is supported on the housing tube so as to be rotatable and immovable in the axial direction, and is rotatably driven by the rotary drive. The spindle nut is non-rotatably connected to the housing tube. In addition, the drive device also includes: a spindle tube concentrically surrounding the threaded spindle; and a guide tube fixedly arranged to the housing tube so as to surround the spindle tube with a clearance. One end of the spindle tube is connected to the spindle nut. In this drive device, when the threaded spindle is rotationally driven by the rotary drive, the cover tube moves in the axial direction together with the spindle nut and the spindle tube.

In addition, JP 4430044 B discloses a drive device including a rotation restricting structure in which a spindle nut rotates along with rotation of a threaded spindle to prevent the spindle nut from rotating relative to a guide tube. The rotation restricting structure includes: a wiper fixedly arranged to a spindle tube; and an axial slot provided so as to penetrate through the guide tube in a radial direction. As the wiper protrudes through the axial slot, the spindle tube and the spindle nut connected to the spindle tube, and the guide tube and the housing tube fixed to the guide tube are prevented from relatively rotating.

SUMMARY OT THE INVENTION

Problems to be Solved by the Invention

However, in the driving device of JP 4430044 B, the spindle nut, the spindle tube fixedly arranged to the spindle nut, and a wiper arranged fixedly to the spindle tube are formed as separate bodies, respectively. For this reason, the spindle nut rotates relative to the guide tube due to a mounting situation of each part, variations of processing dimensions, or the like, so that there is a possibility that the rotational driving of the threaded spindle is not efficiently converted into the linear movement of the spindle tube and spindle nut in the axial direction.

An object of the present invention is to provide a door opening and closing device for vehicles capable of effectively preventing relative rotation of a spindle nut with respect to a guide tube.

SUMMARY OF THE INVENTION

One aspect of the present invention provides a door opening and closing device for vehicles including: a motor drive mechanism; a first housing that accommodates the motor drive mechanism; a spindle drive mechanism connected to the motor drive mechanism; and a second housing that is arranged coaxially with the first housing and relatively moves with respect to the first housing by the spindle drive mechanism. The spindle drive mechanism includes: a spindle connected to the motor drive mechanism; a spindle nut screwed with the spindle; a push rod fixed so as not to rotate relative to the spindle nut; a guide tube through which the push rod is inserted; and a relative rotation restricting portion that restricts relative rotation between the push rod and the guide tube.

According to this door opening and closing device for vehicles, the relative rotation between the push rod and the guide tube is restricted by the relative rotation restricting portion so that the rotational movement of the spindle is converted into relative movement of the spindle nut and the push rod with respect to the guide tube, and the relative rotation of the spindle nut with respect to the guide tube can be effectively prevented.

One aspect of the present invention provides a door opening and closing device for vehicles including: a motor drive mechanism; a first housing that accommodates the motor drive mechanism; a spindle drive mechanism connected to the motor drive mechanism; and a second housing that is arranged coaxially with the first housing and relatively moves with respect to the first housing by the spindle drive mechanism. The spindle drive mechanism includes: a spindle connected to the motor drive mechanism; a spindle nut screwed with the spindle; a push rod fixed so as not to rotate relative to the spindle nut and provided with a protrusion on its outer periphery; and a guide tube in which a guide groove guiding the protrusion of the push rod in an axial direction is formed.

According to this door opening and closing device for vehicles, the push rod is fixed so as not to rotate relative to the spindle nut, and the protrusion of the push rod is guided through the guide groove of the guide tube in the axial direction. For this reason, the rotational movement of the spindle is converted into the relative movement of the spindle nut and the push rod with respect to the guide tube, and the relative rotation of the spindle nut with respect to the guide tube can be effectively prevented.

One aspect of the present invention provides a door opening and closing device for vehicles including: a motor drive mechanism; a first housing that accommodates the motor drive mechanism; a spindle drive mechanism connected to the motor drive mechanism; and a second housing that is arranged coaxially with the first housing and relatively moves with respect to the first housing by the spindle drive mechanism. The spindle drive mechanism includes: a spindle connected to the motor drive mechanism; a spindle nut screwed with the spindle; a push rod fixed so as not to rotate relative to the spindle nut and having an outer peripheral surface whose cross section orthogonal to a longitudinal direction forms a polygon; and a guide tube having a guide portion through which the push rod is inserted. The guide portion has an inner peripheral surface whose cross section orthogonal to the longitudinal direction of the guide tube forms a shape corresponding to the outer peripheral surface of the push rod.

According to this door opening and closing device for vehicles, the spindle nut is fixed to the push rod so as not to rotate relative to the push rod. In addition, since the push rod is inserted through the guide portion of the guide tube, the rotational movement of the spindle is converted into the relative movement of the spindle nut and the push rod with respect to the guide tube. For this reason, the relative rotation of the spindle nut with respect to the guide tube can be prevented.

The door opening and closing device for vehicles of the present invention can prevent the relative rotation of the spindle nut with respect to the guide tube.

DETAILED DESCRIPTION OF THE INVENTION

Hereinafter, embodiments of the present invention will be described with reference to the accompanying drawings.

First Embodiment

Figure 1:
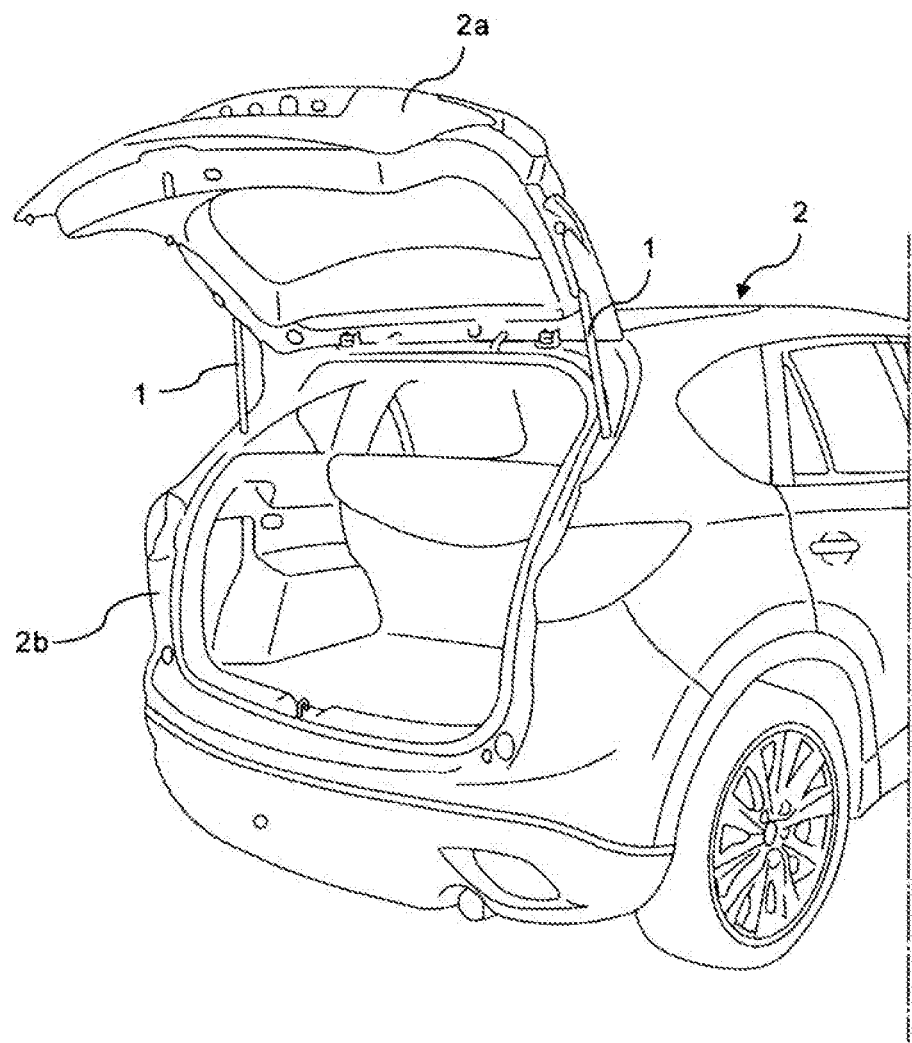
FIG. 1 is a perspective view illustrating a rear portion of a body for vehicles in which a door opening and closing device for vehicles according to a first embodiment of the present invention is employed.

Referring to FIG. 1, a door opening and closing device 1 for vehicles according to a first embodiment of the present invention has a cylindrical shape and is connected to a door 2a and a body 2b of a vehicle 2. When the door opening and closing device for vehicles 1 stretches and contracts, the door 2a is driven to be open and closed. In the following description, "axial direction", "circumferential direction", and "radial direction" indicate the axial direction, the circumferential direction, and the radial direction of the door opening and closing device 1 for vehicles, respectively.

Figure 2:
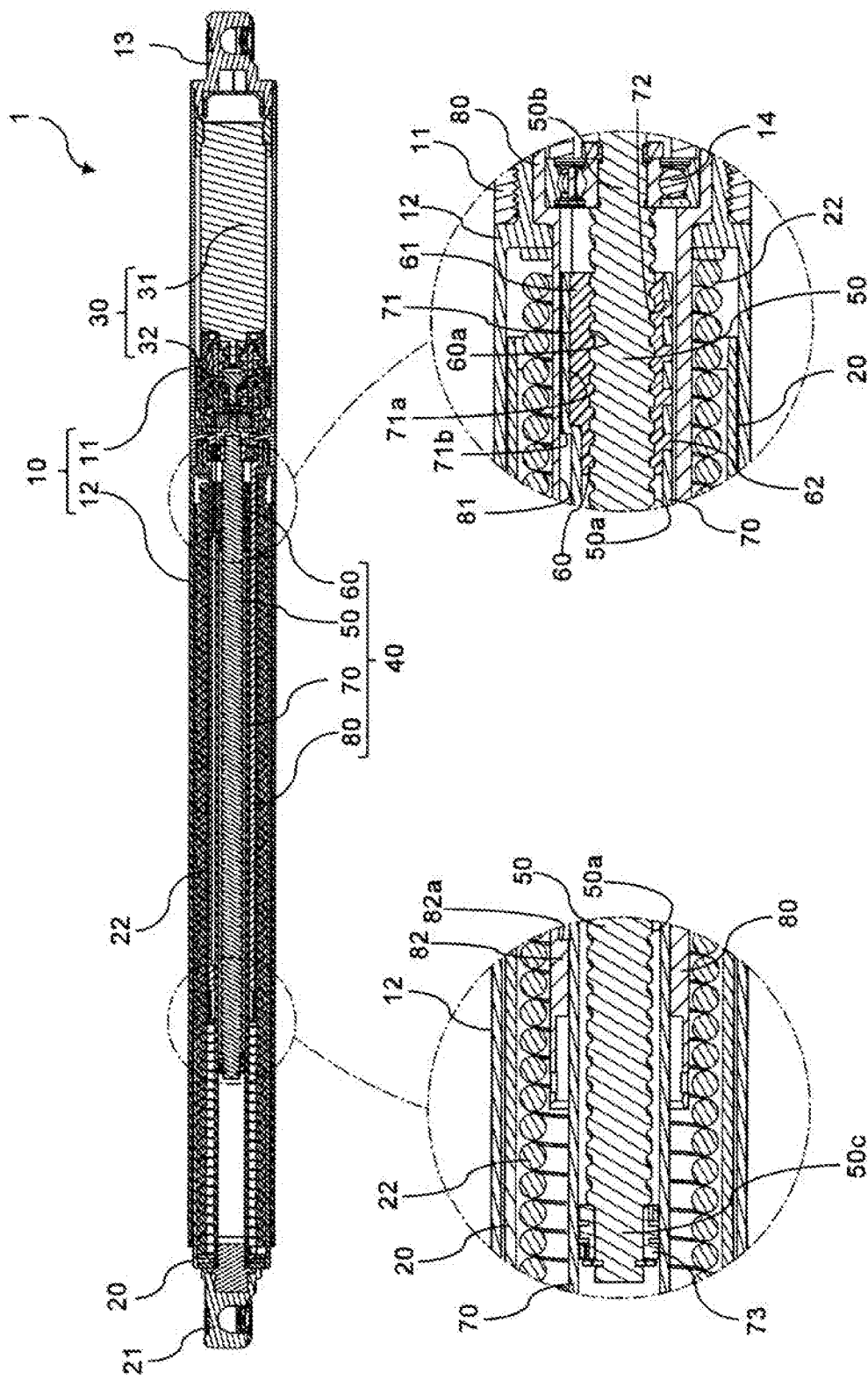
FIG. 2 is a longitudinal cross-sectional view of the door opening and closing device for vehicles according to the first embodiment.

Referring to FIG. 2, the door opening and closing device 1 for vehicles according to the first embodiment includes a first housing 10, a second housing 20, a motor drive mechanism 30, and a spindle drive mechanism 40.

The first housing 10 includes a cylindrical accommodating portion 11 that accommodates the motor drive mechanism 30, and a cylindrical cover 12 that is screwed and fixed to the accommodating portion 11. Here, the first housing 10 may have a structure in which the accommodating portion 11 and the cover 12 are integrated. One end (right end in the drawing) of the accommodating portion 11 in the axial direction is open, and is closed by a shaft end member 13. The first housing 10 is connected to the body 2b of the vehicle 2 via a ball joint (not illustrated) connected to the shaft end member 13.

The second housing 20 is cylindrical, and an outer diameter of the second housing 20 is smaller than an inner diameter of the first housing 10. The second housing 20 is arranged coaxially with the first housing 10, and is accommodated inside the first housing 10 so as to be movable relative to the first housing 10 in the axial direction. One end of the second housing 20 is closed by a shaft end member 21.

The second housing 20 is connected to the door 2a of the vehicle 2 via a ball joint (not illustrated) connected to the shaft end member 21. In addition, a coil spring 22 is arranged coaxially with the second housing 20 inside the second housing 20 in the radial direction.

One end (right end in the drawing) of the coil spring 22 abuts on the first housing 10, and the other end (left end in the drawing) of the coil spring 22 abuts on the second housing 20. The coil spring 22 is arranged in a compressed state, and elastically biases the first housing 10 and the second housing 20 in a direction in which the door opening and closing device 1 for vehicles stretches.

The motor drive mechanism 30 includes an electric motor 31 that is a drive source, and a decelerator 32 that reduces the rotational speed of the electric motor 31. The motor drive mechanism 30 is accommodated inside the accommodating portion 11 of the first housing 10.

The spindle drive mechanism 40 includes a spindle 50, a spindle nut 60, a push rod 70, and a guide tube 80. The spindle drive mechanism 40 is arranged inside the coil spring 22 in the radial direction. Specifically, in the radial direction, the guide tube 80 is arranged inside the coil spring 22, and the push rod 70 is accommodated inside the guide tube 80. In addition, the spindle nut 60 is fixed to one end of the push rod 70. The spindle 50 is arranged inside the push rod 70 and the spindle nut 60 in the radial direction.

As illustrated most clearly in FIG. 2, the spindle 50 is provided with a thread groove 50a on its outer peripheral surface. The spindle 50 is coaxially arranged in the first housing 10. As illustrated most clearly in FIG. 2, a proximal end 50b of the spindle 50 is rotatably supported by a bearing 14 provided in the first housing 10. In addition, the spindle 50 is mechanically connected to a rotating shaft of the electric motor 31 via the decelerator 32, and is rotationally driven by the electric motor 31.

Figure 3:
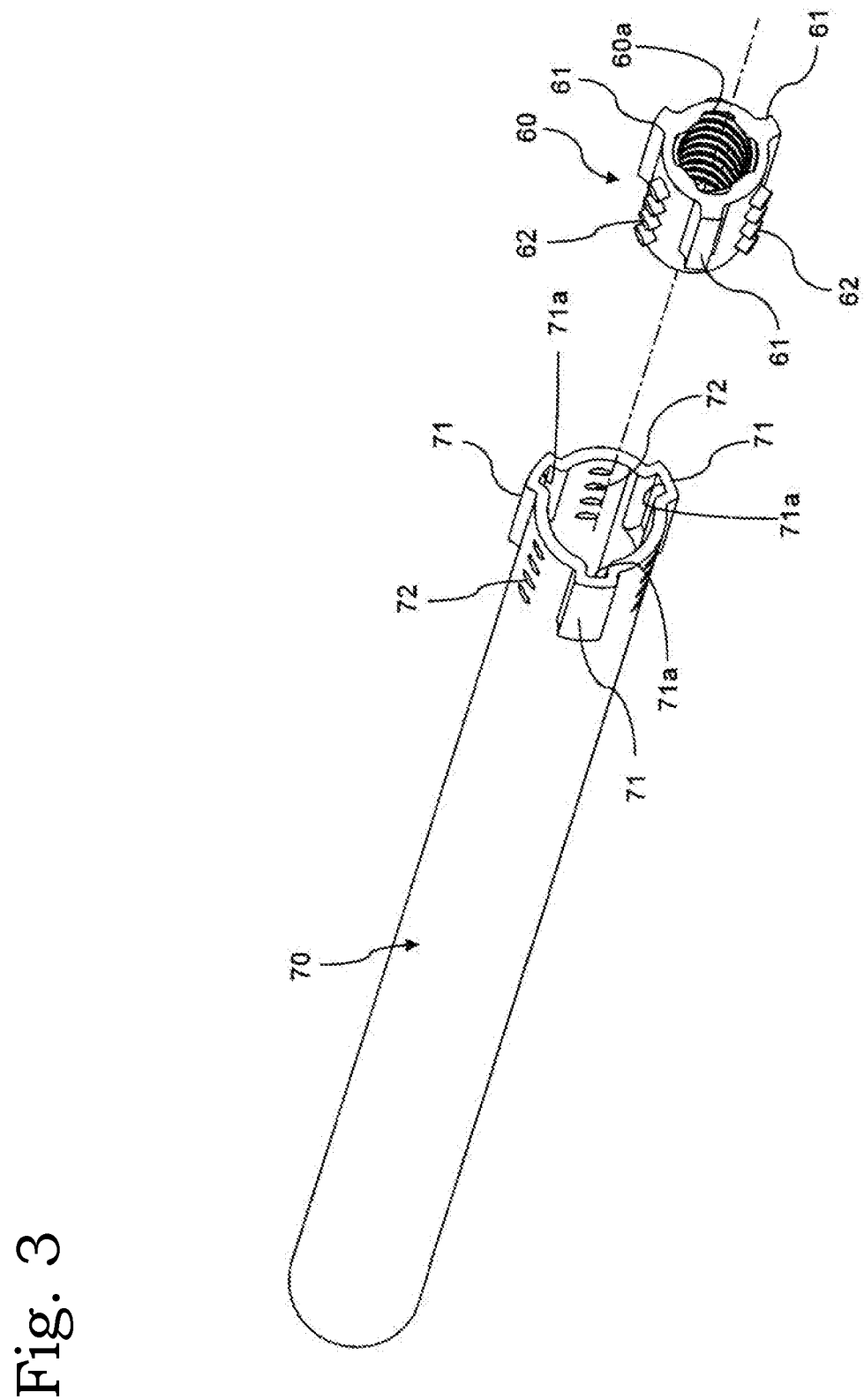
FIG. 3 is an exploded perspective view of a push rod and a spindle nut.

A thread groove 60a is provided on an inner peripheral surface of the spindle nut 60, and is screwed with the thread groove 50a of the spindle 50. Referring also to FIG. 3, the spindle nut 60 includes convex portions 61 and engagement protrusions 62 on its outer periphery. The convex portion 61 of the present embodiment has a substantially rectangular cross section in a cross section orthogonal to the axial direction. In addition, the convex portion 61 of the spindle nut 60 of the present embodiment is provided at three equally spaced locations in the circumferential direction of the spindle nut 60, and the engagement protrusions 62 are provided four by four between the adjacent convex portions 61 in the circumferential direction. Here, the spindle nut 60 of the present embodiment is made of resin.

Referring to FIGS. 2 and 3, the push rod 70 is cylindrical, and an end on a side opposite to the spindle nut 60 side is fixed to one end (on the shaft end member 21 side) of the second housing 20. An inner diameter of the push rod 70 is substantially the same as an outer diameter of the spindle nut 60. The push rod 70 has a protrusion 71 on its outer periphery and an engagement hole 72 with which the engagement protrusion 62 of the spindle nut 60 is engaged. The protrusion 71 has a concave portion 71a in which the convex portion 61 of the spindle nut 60 is fitted on its inner periphery, and a wall 71b erected upright from the push rod 70 in the axial direction. The push rod 70 and the spindle nut 60 are coaxially fixed by fitting the concave portion 71a of the protrusion 71 and the convex portion 61 of the spindle nut 60.

The push rod 70 of the present embodiment is made of metal, and the protrusion 71 is molded by press working. In the present embodiment, the spindle nut 60 made of resin and the push rod 70 made of metal are integrally molded by insert-molding. In addition, as illustrated most clearly in FIG. 2, a resin rotor 73 that rotatably supports the distal end 50c of the spindle 50 on the inner periphery of the push rod 70 without rattling is provided on the inner periphery of the push rod 70. The spindle 50 having both ends supported by the bearing 14 provided in the first housing 10 and the resin rotor 73 provided on the distal end 50c of the spindle 50, and is arranged coaxially with the first housing 10.

Figure 4:
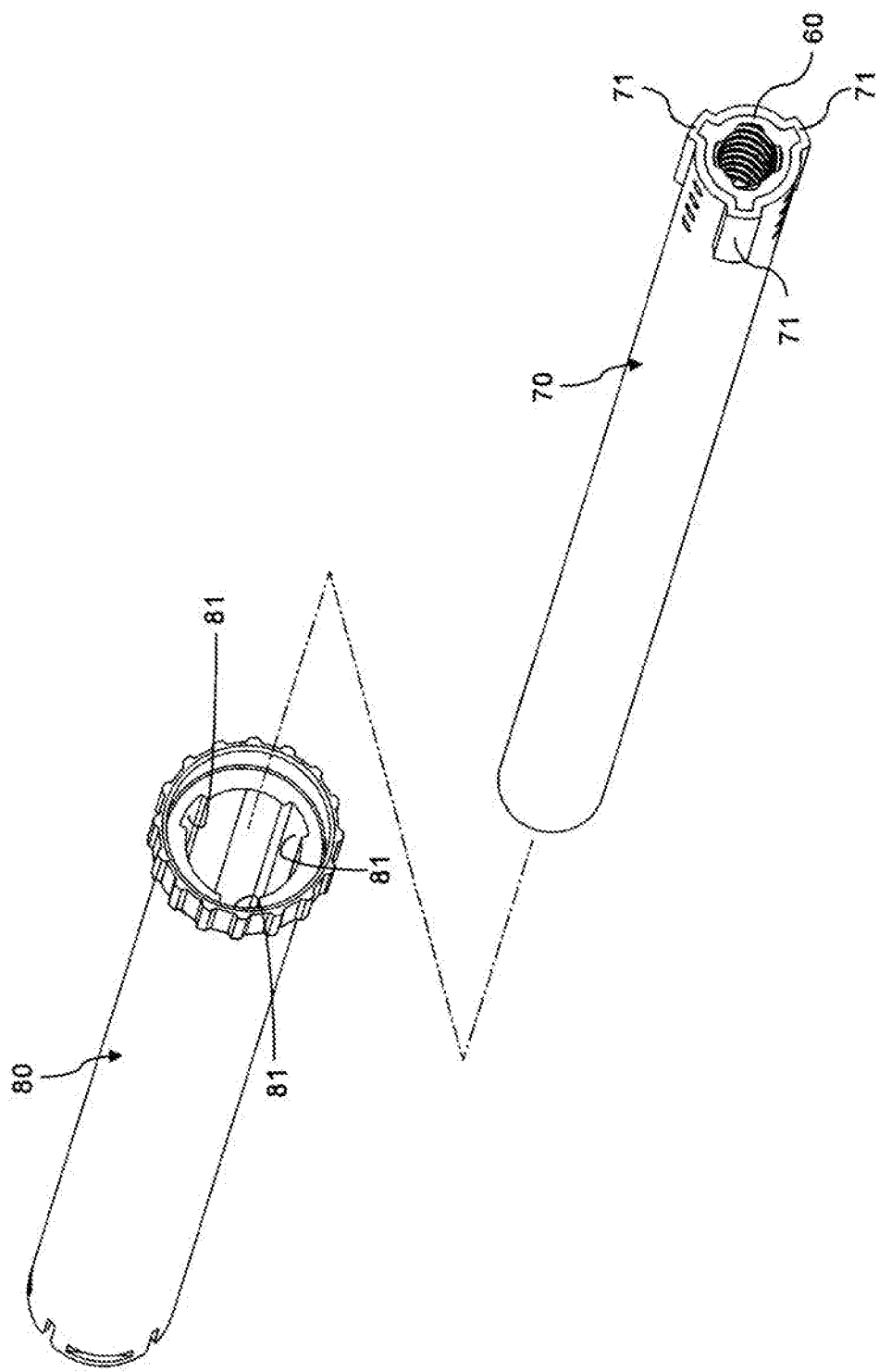
FIG. 4 is an exploded perspective view of a guide tube and the push rod integrally provided with the spindle nut.

The guide tube 80 is cylindrical and is fixed to the first housing 10. An inner diameter of the guide tube 80 is larger than an outer diameter of the push rod 70. A guide groove 81 that accommodates the protrusion 71 of the push rod 70 and guides the protrusion 71 in the axial direction is formed on the inner periphery of the guide tube 80. As illustrated in FIG. 4, when the guide groove 81 of the guide tube 80 and the protrusion 71 of the push rod 70 are engaged, the push rod 70 is attached to the guide tube 80 so as to be relatively movable and not to be relatively rotatable. In addition, as illustrated most clearly in FIG. 2, the guide tube 80 is provided with a locking portion 82, which can lock the protrusion 71 of the push rod 70, at an end of the guide groove 81. The locking portion 82 has a locking surface 82a that opposes the wall 71b of the protrusion 71 and is perpendicular to the axial direction.

Figure 5:
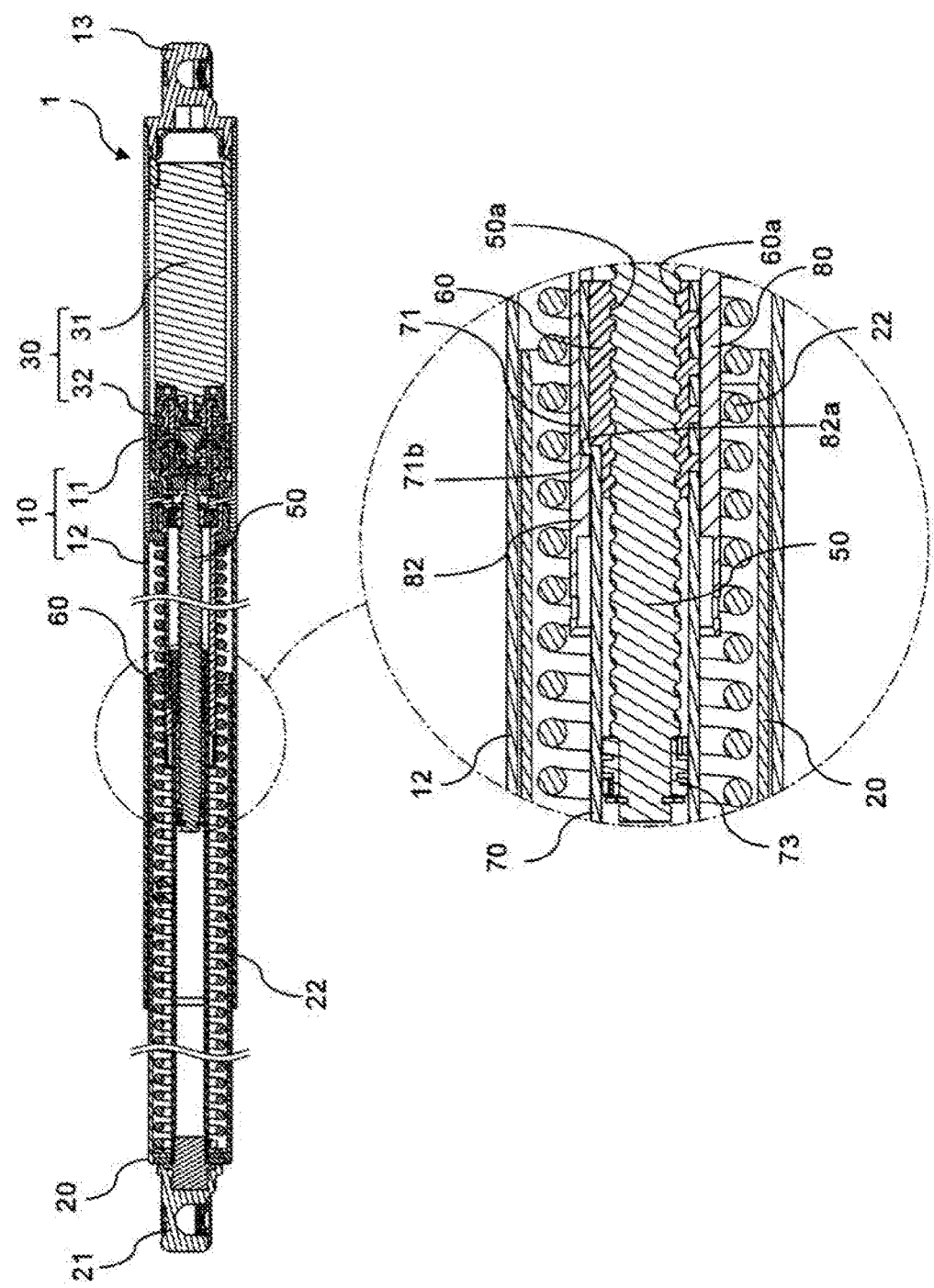
FIG. 5 is a longitudinal cross-sectional view of the door opening and closing device for vehicles in a stretched state.

In a state where the door 2a of the vehicle 2 is closed, the coil spring 22 is in the most compressed state in the door opening and closing device 1 for vehicles, and the spindle nut 60 is located near the proximal end 50b of the spindle 50 as illustrated in FIG. 2. When the electric motor 31 is driven from this state, the rotation of an output shaft of the electric motor 31 is reduced by the decelerator 32 and transmitted to the spindle 50, and the spindle 50 is rotationally driven. Since the spindle nut 60 and the push rod 70 are engaged with the guide tube 80 and the first housing 10 so as not to relatively rotate, the rotational movement of the spindle 50 is converted into the linear movement of the spindle nut 60 with respect to the guide tube 80. Specifically, the spindle nut 60 and the push rod 70 move in the axial direction along the guide groove 81 of the guide tube 80. Along with the movement of the push rod 70, the second housing 20 moves relative to the first housing 10. Since the first housing 10 and the second housing 20 relatively move as described above, the door opening and closing device 1 for vehicles stretches and drives the door 2a connected via the shaft end member 21 up to an open position. Here, as illustrated most clearly in FIG. 5, the relative movement of the push rod 70 with respect to the guide tube 80 is restricted as the wall 71b of the protrusion 71 and the locking surface 82a of the locking portion 82 abuts on each other.

As the convex portion 61 of the spindle nut 60 is fitted into the concave portion 71a provided on the protrusion 71 of the push rod 70, the push rod 70 and the spindle nut 60 are fixed. In addition, as the protrusion 71 of the push rod 70 is accommodated in the guide groove 81 of the guide tube 80, the rotational movement of the spindle 50 is converted into the relative movement of the spindle nut 60 and the push rod 70 with respect to the guide tube 80. For this reason, the relative rotation of the spindle nut 60 with respect to the guide tube 80 can be prevented.

The protrusion 71 provided on the outer periphery of the push rod 70 and the guide groove 81, which is formed in the guide tube 80 and guides the protrusion 71 of the push rod 70 in the axial direction, constitute a relative rotation restricting portion.

Since the spindle nut 60 is molded integrally with the push rod 70 by insert-molding, it is possible to prevent the spindle nut 60 from rotating relative to the push rod 70 and from falling off.

Since the push rod 70 and the spindle nut 60 are fixed by the engagement between the engagement protrusion 62 and the engagement hole 72, the spindle nut 60 can be prevented from falling off from the push rod 70.

As the protrusion 71 of the push rod 70 is locked in the axial direction by the locking portion 82 provided in the guide groove 81 of the guide tube 80, the relative movement between the guide tube 80 and the push rod 70 is restricted. That is, since the protrusion 71 of the push rod 70 can restrict the relative movement and the relative rotation of the push rod 70 with respect to the guide tube 80, it is unnecessary to use a separate component for restricting the relative movement between the guide tube 80 and the push rod 70.

The spindle nut 60 rotationally driven by the spindle 50, the push rod 70 moving with the spindle nut 60, and the protrusion 71 that prevents the relative rotation of the push rod 70 with respect to the guide tube 80 operate integrally. The rotational movement of the spindle 50 is directly converted into the relative movement of the spindle nut 60 with respect to the guide tube 80 by the protrusion 71 that operates integrally with the spindle nut 60. For this reason, the relative rotation of the spindle nut 60 with respect to the guide tube 80 can be effectively prevented.

Note that the spindle nut 60 is fixed to the inner circumferential side of one end of the push rod 70 where the protrusion 71 is provided in the first embodiment, but the spindle nut may be arranged on the inner periphery of the push rod 70 with an interval from the protrusion 71.

Second Embodiment

A door opening and closing device for vehicles according to a second embodiment of the present invention has the same configuration as that of the door opening and closing device 1 for vehicles of the first embodiment except for a slit S of the push rod 70.

Figure 6:
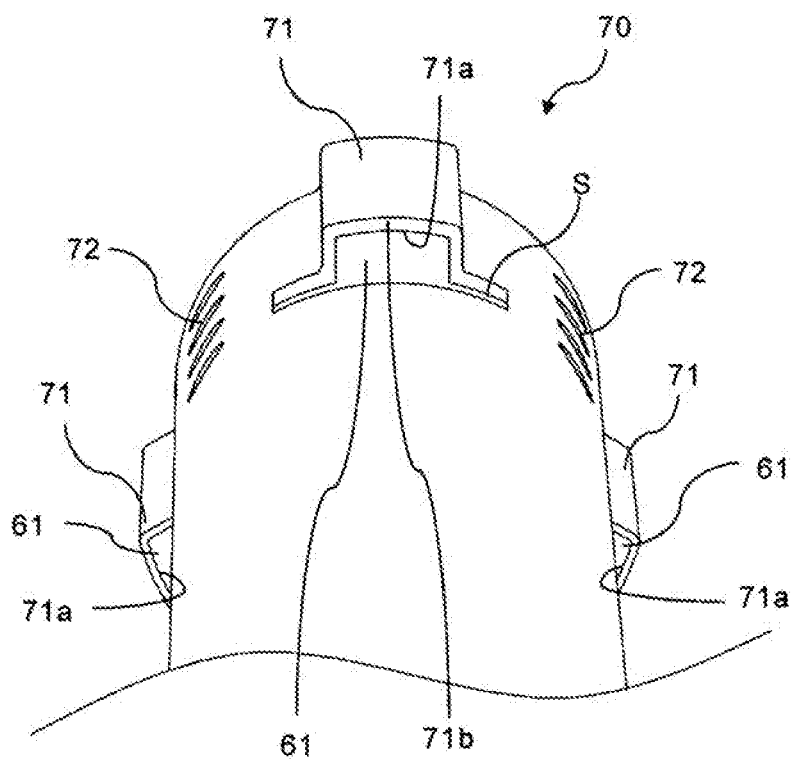
FIG. 6 is a perspective view of a push rod of a door opening and closing device for vehicles according to a second embodiment of the present invention.

Referring to FIG. 6, the push rod 70 in the door opening and closing device for vehicles according to the second embodiment includes the slit S which is adjacent to the protrusion 71 in the axial direction and extends in the circumferential direction.

Figure 7:
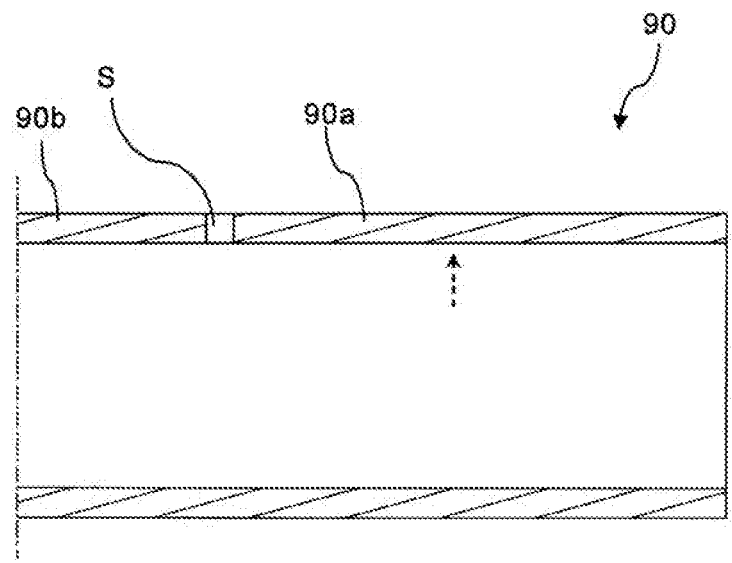
FIG. 7 is a schematic longitudinal cross-sectional view of a cylindrical member used for manufacturing the push rod according to the second embodiment.
Figure 8:
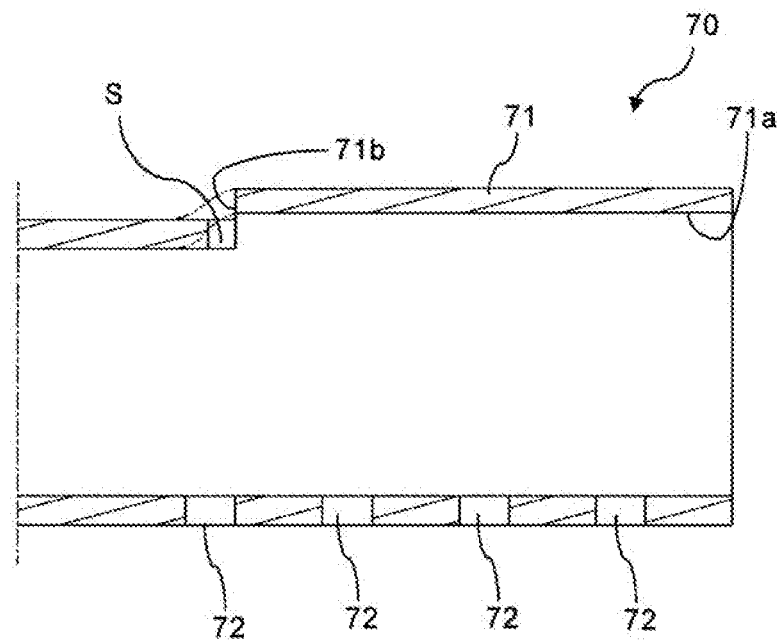
FIG. 8 is a longitudinal cross-sectional view similar to FIG. 7 of the push rod obtained by pressing the cylindrical member.

The protrusion 71 of the second embodiment is formed by press working. Specifically, the push rod 70 having the protrusion 71 is manufactured using a cylindrical member 90 made of metal as illustrated in FIG. 7. The cylindrical member 90 includes a first portion 90a which is subjected to the press working and a second portion 90b which is not subjected to the press working. The slit S extending in the circumferential direction is provided between the first portion 90a and the second portion 90b. The protrusion 71 of the push rod 70 is formed by pressing the first portion 90a of the cylindrical member 90 from the inside (see a broken arrow in FIG. 7). As illustrated in FIG. 8, the wall 71b is formed to be erected upright in the axial direction.

In the case of not providing the slit S, the first portion 90a is/mechanically restrained by the second portion 90b when the first portion 90a is pressed, and thus, it is difficult to form the wall 71b of the protrusion 71 so as to be erected upright in the axial direction in some cases (see a two-dot chain line in FIG. 8). Since the slit S is provided, the first portion 90a and the second portion 90b are divided, and the first portion 90a is not mechanically restrained by the second portion 90b, and thus, the wall 71b can be formed as intended. For this reason, the relative position for restricting the relative movement of the push rod 70 with respect to the guide tube 80 can be accurately determined.

Third Embodiment

A door opening and closing device for vehicles according to a third embodiment of the present invention has the same configuration as that of the door opening and closing device 1 for vehicles of the first embodiment except for a push rod 170.

Figure 9:
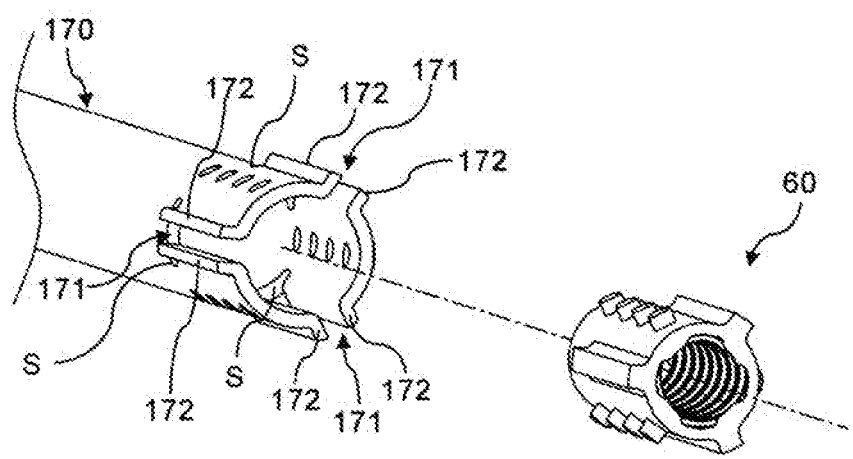
FIG. 9 is an exploded perspective view of a push rod and a spindle nut of a door opening and closing device for vehicles according to a third embodiment of the present invention.

Referring to FIG. 9, each of protrusions 171 of the push rod 170 in the door opening and closing device for vehicles according to the third embodiment has a pair of side walls 172 which are erected upright in the axial direction from the push rod 170 and extend in the axial direction. The pair of side walls 172 are spaced apart in the circumferential direction of the push rod 170. In addition, the push rod 170 of the third embodiment includes the slit S which is adjacent to the protrusion 171 in the axial direction and extends in the circumferential direction, which is similar to the second embodiment.

Figure 10:
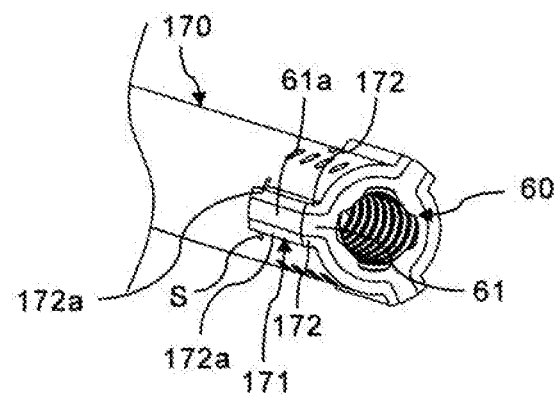
FIG. 10 is a perspective view of the push rod integrally provided with the spindle nut according to the third embodiment.

Referring to FIG. 10, the spindle nut 60 and the push rod 170 are integrally molded by insert-molding. The convex portion 61 of the spindle nut 60 is formed between the pair of side walls 172, and the outer peripheral surface 61a of the convex portion 61 of the spindle nut 60 is formed so as to be smoothly continuous to outer peripheral surfaces 172a of the pair of side walls 172.

Figure 11:
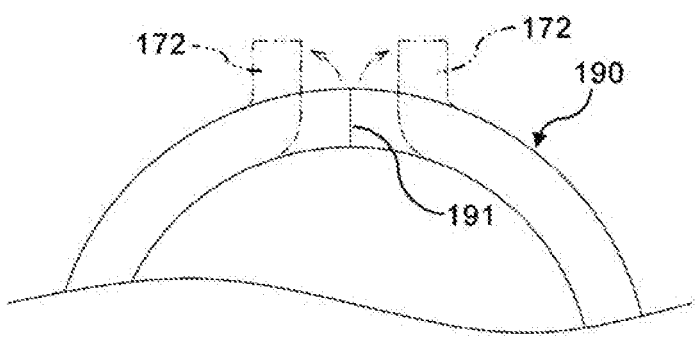
FIG. 11 is a front view of a cylindrical member used for manufacturing the push rod according to the third embodiment.

The push rod 170 of the present embodiment is manufactured using, for example, a cylindrical member 190 made of metal as illustrated in FIG. 11. The cylindrical member 190 is provided with a cut 191, which divides the cylindrical member 190 in the circumferential direction and extends in the axial direction, and the side wall 172 is formed by bending a portion divided by the cut 191 from the radially inner side to the outside (see an arrow in the drawing).

In the present embodiment, the side walls 172 of the push rod 170 is divided in the circumferential direction and are not mechanically restrained from each other, and thus, it is possible to easily form the protrusion 171 as intended by forming the side walls 172 by bending. In addition, since the slit S is provided to be adjacent to the protrusion 171 in the axial direction, the side wall 172 is not mechanically restrained in the axial direction, and the protrusion 171 can be formed without twisting an axial end of the side wall 172.

Fourth Embodiment

A door opening and closing device for vehicles according to a fourth embodiment of the present invention has the same configuration as that of the door opening and closing device 1 for vehicles of the first embodiment except for a push rod 270 and a guide tube 280.

Figure 12:
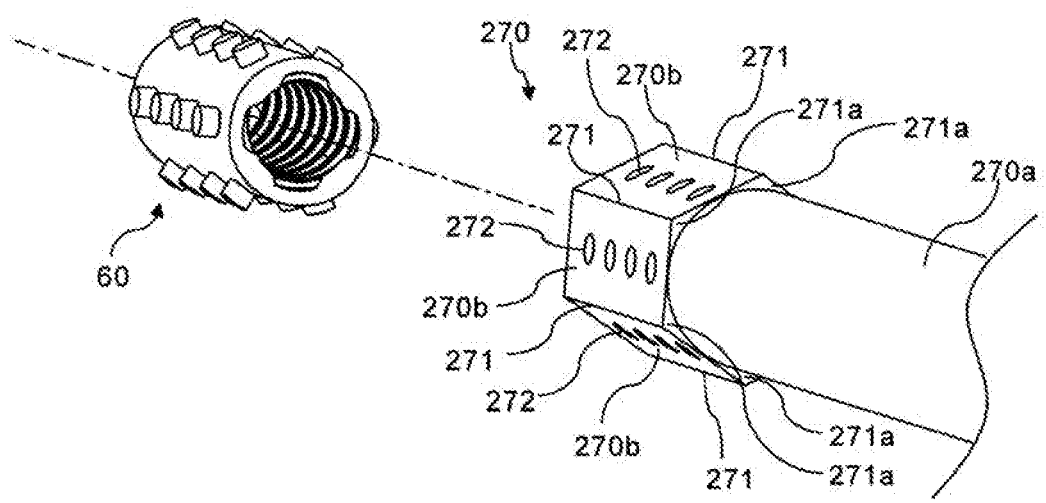
FIG. 12 is an exploded perspective view of a push rod and a spindle nut of a door opening and closing device for vehicles according to a fourth embodiment of the present invention.
Figure 13:
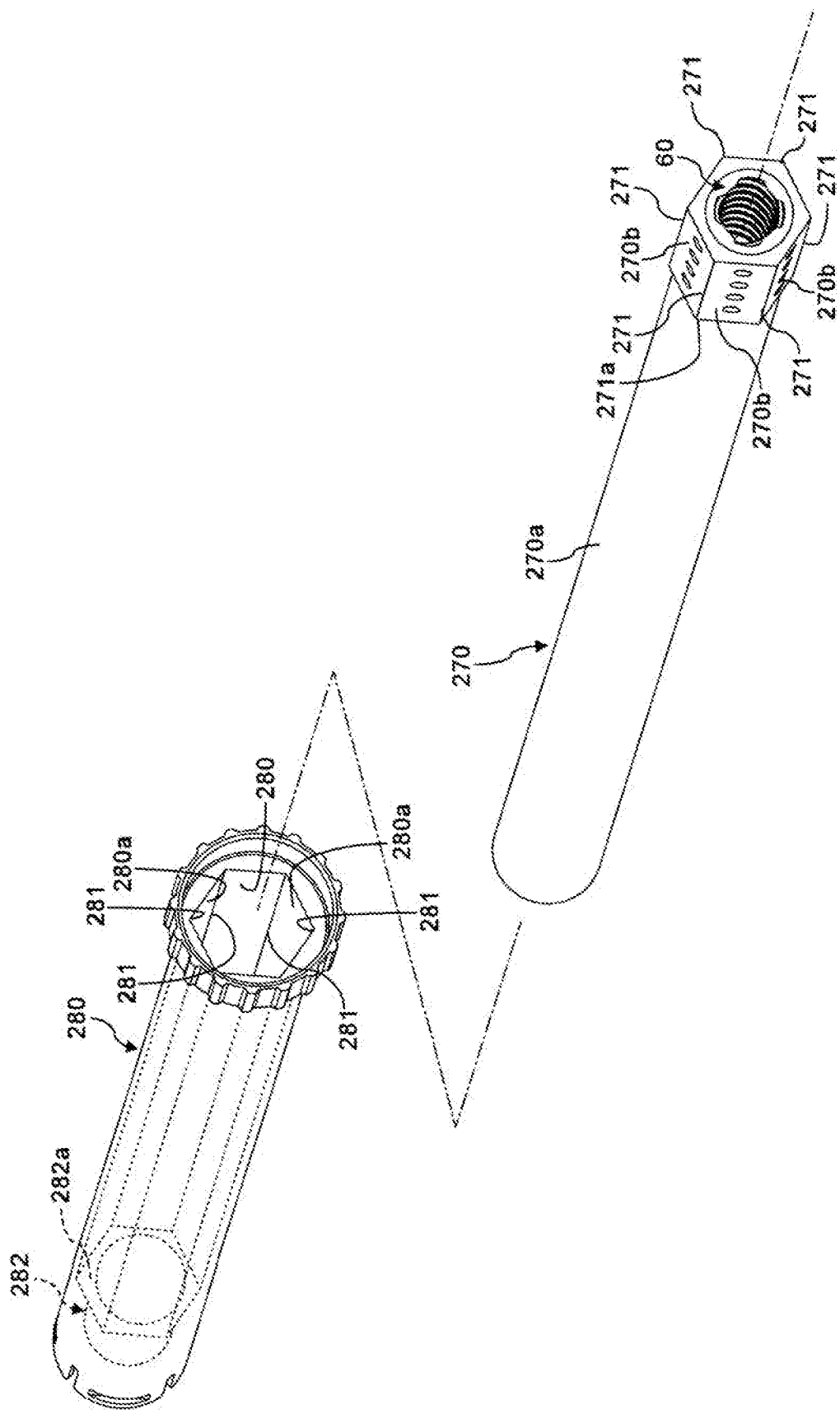
FIG. 13 is an exploded perspective view of a guide tube and the push rod integrally provided with the spindle nut according to a fourth embodiment.

Referring to FIGS. 12 and 13, the push rod 270 in the door opening and closing device for vehicles according to the fourth embodiment has a substantially cylindrical shape, and has an outer peripheral surface 270a that forms a circle in a cross section orthogonal to a longitudinal direction of the push rod 270. In addition, the push rod 270 has an outer peripheral surface, which forms a hexagon in a cross section orthogonal to the longitudinal direction of the push rod 270, at one end. Specifically, at one end, the push rod 270 includes six outer peripheral surfaces 270b, each of which is a flat surface, and six protrusions 271 are formed by two outer peripheral surfaces 270b that are adjacent to each other in the circumferential direction. The protrusion 271 forms a wall 271a extending perpendicularly to the axial direction of the push rod 270 from the outer peripheral surface 270a of the push rod 270. A plurality of (four in the illustrated embodiment) through-holes 272 are formed in each of the outer peripheral surfaces 270b of the push rod 270.

Referring to FIG. 13, an inner peripheral surface of the guide tube 280 has a shape corresponding to the outer peripheral surface 270b of the push rod 270 such that the push rod 270 can slide. The inner peripheral surface of the guide tube 280 of the present embodiment forms a hexagon in a cross section orthogonal to a longitudinal direction of the guide tube 280. Specifically, the guide tube 280 includes six inner peripheral surfaces 280a each of which is a flat surface and opposes the outer peripheral surface 270b of the push rod 270. That is, in the cross section orthogonal to the axial direction, the cross-sectional shape formed by the inner peripheral surface 280a of the guide tube 280 is a shape that is similar to and slightly larger than the cross-sectional shape of the outer peripheral surface 270b of the push rod 270. A guide groove 281, which accommodates the protrusion 271 and guiding the protrusion 271 in the axial direction, is formed in an inner periphery of the guide tube 280 by the two inner peripheral surfaces 280a adjacent in the circumferential direction. Note that the guide tube 280 is provided with a locking portion 282 that can lock the protrusion 271 of the push rod 270 at an end of the guide groove 281. The locking portion 282 is formed to have a cylindrical cross section with a locking surface 282a, which opposes the wall 271a of the protrusion 271 and is perpendicular to the axial direction, and holds an outer peripheral surface of the outer peripheral surface 270a of the push rod 270 in the radial direction.

In the fourth embodiment, the same operations and effects as those of the first embodiment are achieved.

Fifth Embodiment

A door opening and closing device for vehicles according to a fifth embodiment of the present invention has the same configuration as that of the door opening and closing device 1 for vehicles of the first embodiment except for a spindle drive mechanism and a cover 312.

Figure 14:
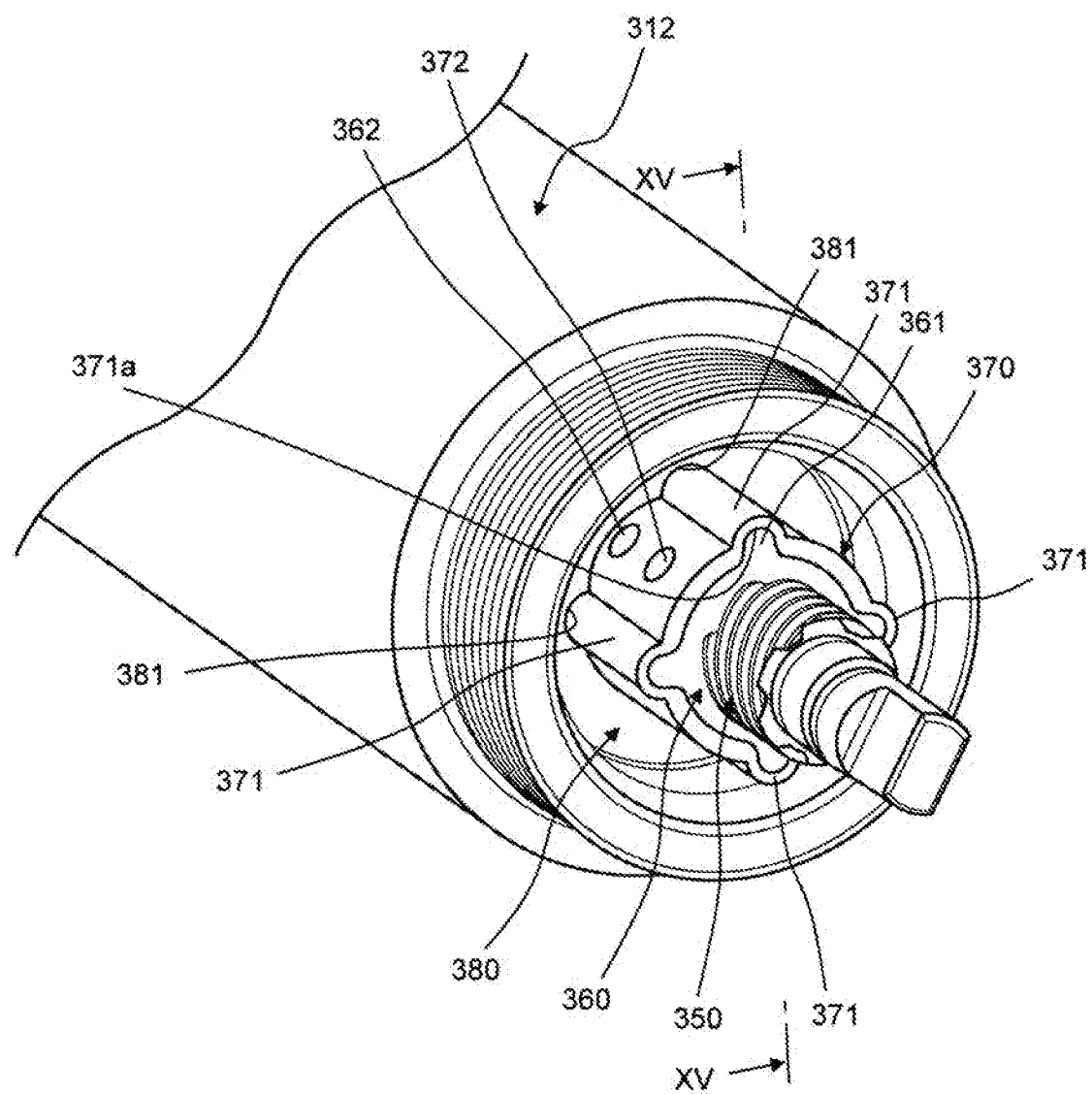
FIG. 14 is a perspective view of a cover, a push rod integrally provided with a spindle nut, and a spindle of a door opening and closing device for vehicles according to a fifth embodiment of the present invention.
Figure 15:
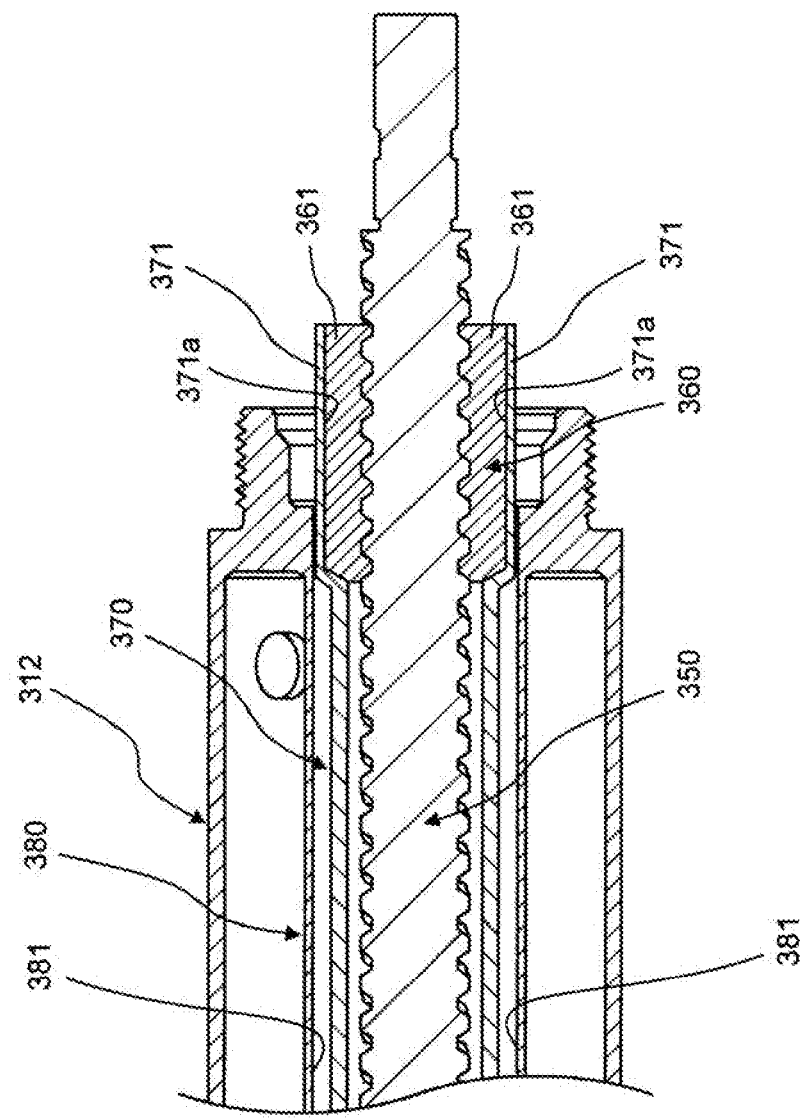
FIG. 15 is a cross-sectional view taken along line XV-XV in FIG. 14.

Referring to FIGS. 14 and 15, the spindle drive mechanism in the door opening and closing device for vehicles according to the fifth embodiment includes a spindle 350, a spindle nut 360, a push rod 370, and a guide tube 380. Note that FIG. 15 is a cross-sectional view taken along line XV-XV in FIG. 14.

The push rod 370 includes four protrusions 371 provided on its outer periphery, and an engagement hole 372 with which an engagement protrusion 362 of the spindle nut 360 is engaged. The four protrusions 371 are provided on the outer periphery of the push rod 370 at equal intervals in the circumferential direction. In addition, the protrusion 371 has, on its inner periphery, a concave portion 371a in which a convex portion 361 of the spindle nut 360 is fitted. The push rod 370 and the spindle nut 360 are coaxially fixed by fitting the concave portion 371a of the protrusion 371 and the convex portion 361 of the spindle nut 360. The push rod 370 is made of metal, and the protrusion 371 is molded by press working. In the present embodiment, the spindle nut 360 made of resin and the push rod 370 made of metal are integrally molded by insert-molding.

The guide tube 380 is cylindrical and is provided on an inner periphery of the cover 312. A guide groove 381 that guides the protrusion 371 of the push rod 370 in the axial direction is formed on an inner periphery of the guide tube 380. As the guide groove 381 of the guide tube 380 is engaged with the protrusion 371 of the push rod 370, the push rod 370 is attached to the guide tube 380 so as to be relatively movable in the axial direction, and the relative rotation with respect to the guide tube 380 is restricted. In addition, the guide tube 380 is provided with a locking portion (not illustrated), which can lock the protrusion 371 of the push rod 370, at an end of the guide groove 381.

Note that the second housing 20 and the coil spring 22 arranged between the cover 312 and the guide tube 380 are omitted in FIG. 15.

In the fifth embodiment, the same operations and effects as those of the first embodiment are achieved.

Sixth Embodiment

A door opening and closing device for vehicles according to a sixth embodiment of the present invention has the same configuration as that of the door opening and closing device for vehicles of the fifth embodiment except for a spindle nut 460 and a push rod 470.

Figure 16:
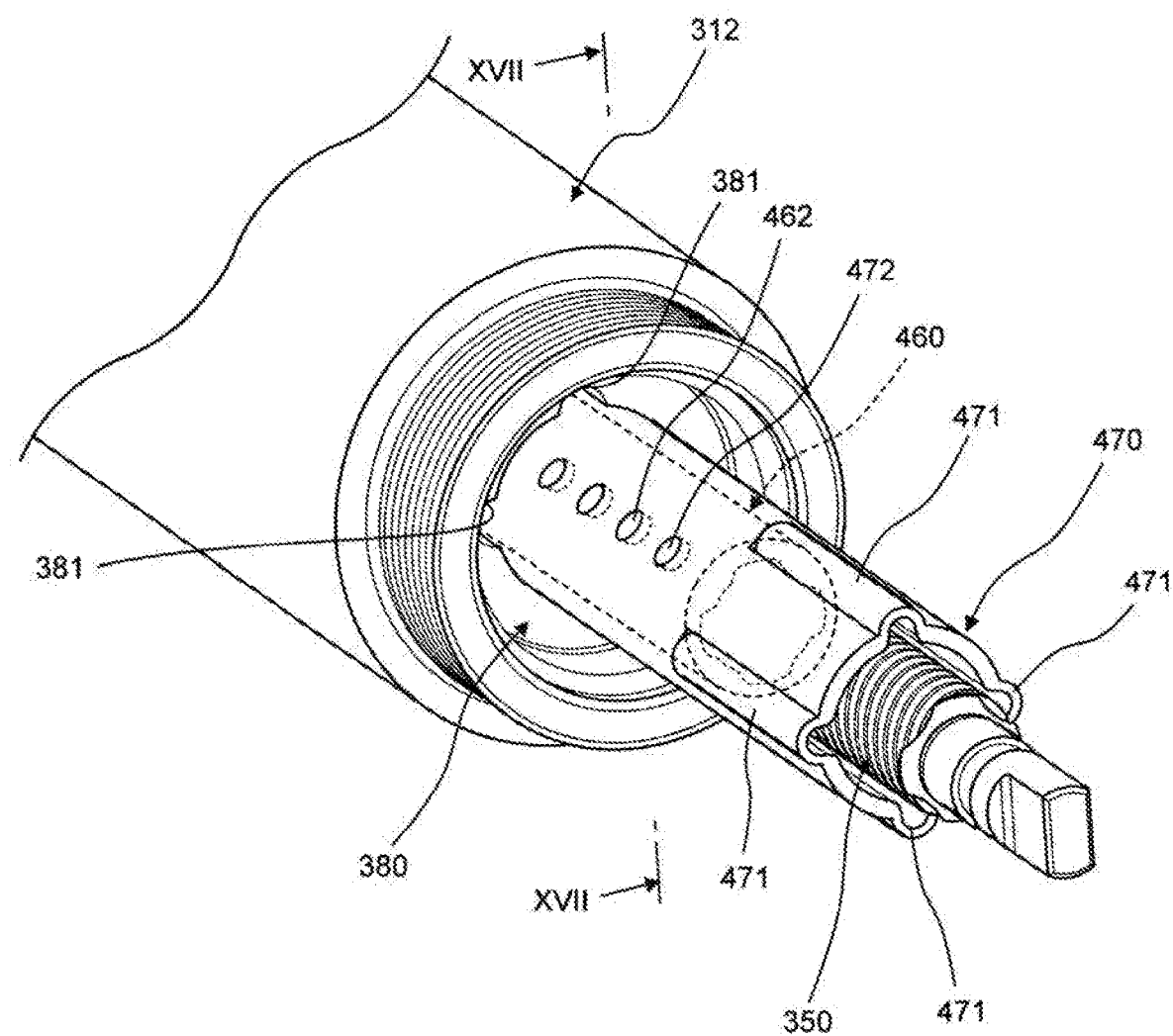
FIG. 16 is a perspective view of a cover, a push rod integrally provided with a spindle nut, and a spindle of a door opening and closing device for vehicles according to a sixth embodiment of the present invention.
Figure 17:
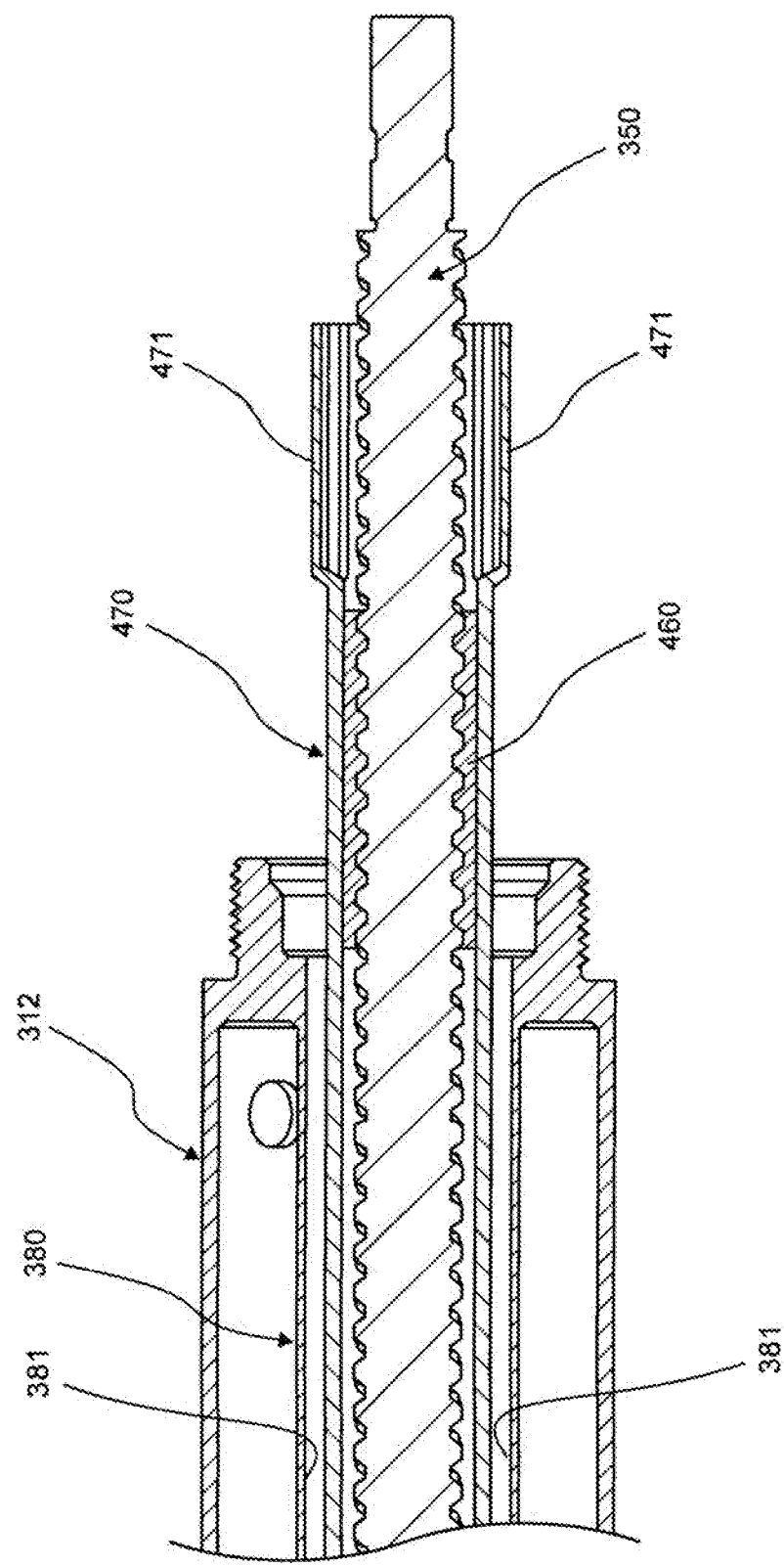
FIG. 17 is a cross-sectional view taken along line XVII-XVII in FIG. 16.

Referring to FIGS. 16 and 17, the spindle drive mechanism in the door opening and closing device for vehicles according to the sixth embodiment includes the spindle 350, a spindle nut 460, a push rod 470, and the guide tube 380. Note that FIG. 17 is a cross-sectional view taken along line XVII-XVII in FIG. 16.

The push rod 470 includes four protrusions 471 provided on its outer periphery, and a plurality of engagement holes 472 provided on the other end side of the protrusion 471 in the axial direction. The four protrusions 471 are provided on the outer periphery of the push rod 470 at equal intervals in the circumferential direction. An engagement protrusion 462 of the spindle nut 460 is engaged with the engagement hole 472 of the push rod 470. In the present embodiment in which the push rod 470 is made of metal and the protrusion 471 is molded by press working, the spindle nut 360 made of resin and the push rod 470 made of metal are integrally molded by insert-molding.

The guide tube 380 is cylindrical and is provided on an inner periphery of the cover 312. The cover 312 and the guide tube 380 are integrally formed. The guide groove 381 that guides the protrusion 471 of the push rod 470 in the axial direction is formed on an inner periphery of the guide tube 380. As the guide groove 381 of the guide tube 380 is engaged with the protrusion 471 of the push rod 470, the push rod 470 is attached to the guide tube 380 so as to be relatively movable in the axial direction, and the relative rotation with respect to the guide tube 380 is restricted. In addition, the guide tube 380 is provided with a locking portion (not illustrated), which can lock the protrusion 471 of the push rod 470, at an end of the guide groove 381.

Note that the second housing 20 and the coil spring 22 arranged between the cover 312 and the guide tube 380 are omitted in FIG. 17.

In this manner, in the door opening and closing device for vehicles according to the sixth embodiment, the spindle nut 460 is arranged not on the inner periphery one of a first end side of the push rod 470 where the protrusion 471 is provided but on the inner periphery of the push rod 470 so as to be closer to a second end of the push rod 470 than is the protrusion 471.

The spindle nut 460 is arranged on the inner periphery of the push rod 470 with an interval from the protrusion 471.

In the sixth embodiment, the same operations and effects as those of the first embodiment are achieved.

Seventh Embodiment

A door opening and closing device for vehicles according to a seventh embodiment of the present invention has the same configuration as that of the door opening and closing device 1 for vehicles of the first embodiment except for a spindle drive mechanism.

Figure 18:
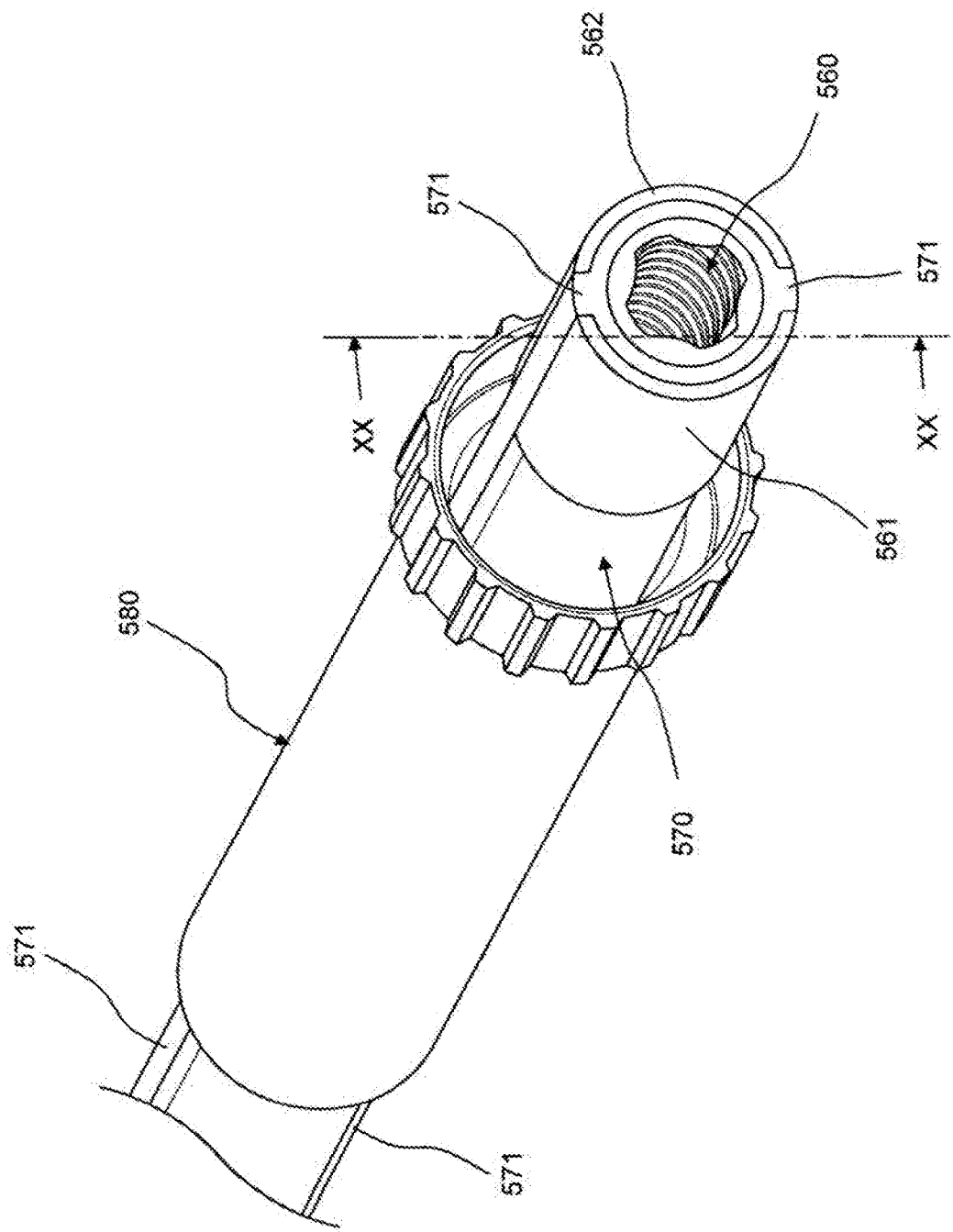
FIG. 18 is a perspective view of a guide tube and a push rod integrally provided with a spindle nut of a door opening and closing device for vehicles according to a seventh embodiment of the present invention.
Figure 19:
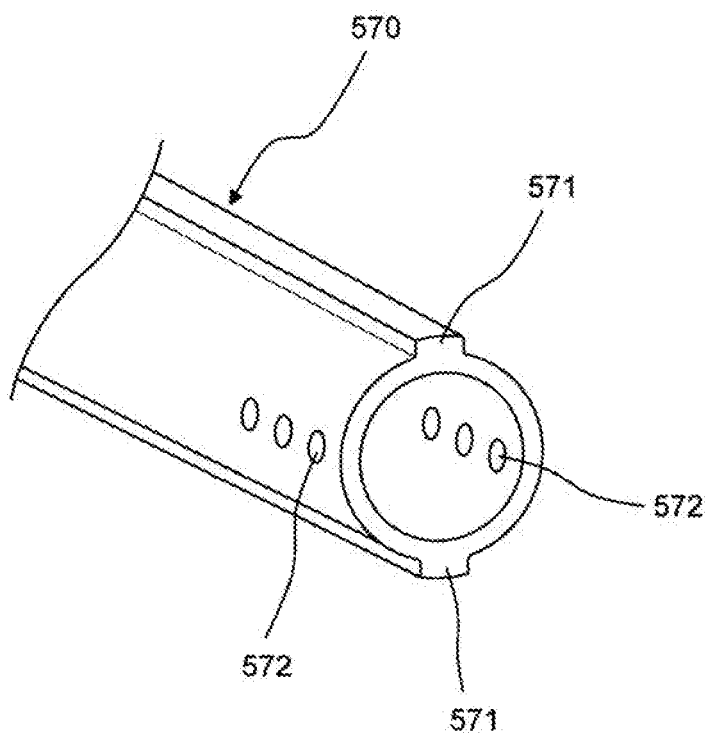
FIG. 19 is a perspective view of the push rod according to the seventh embodiment.
Figure 20:
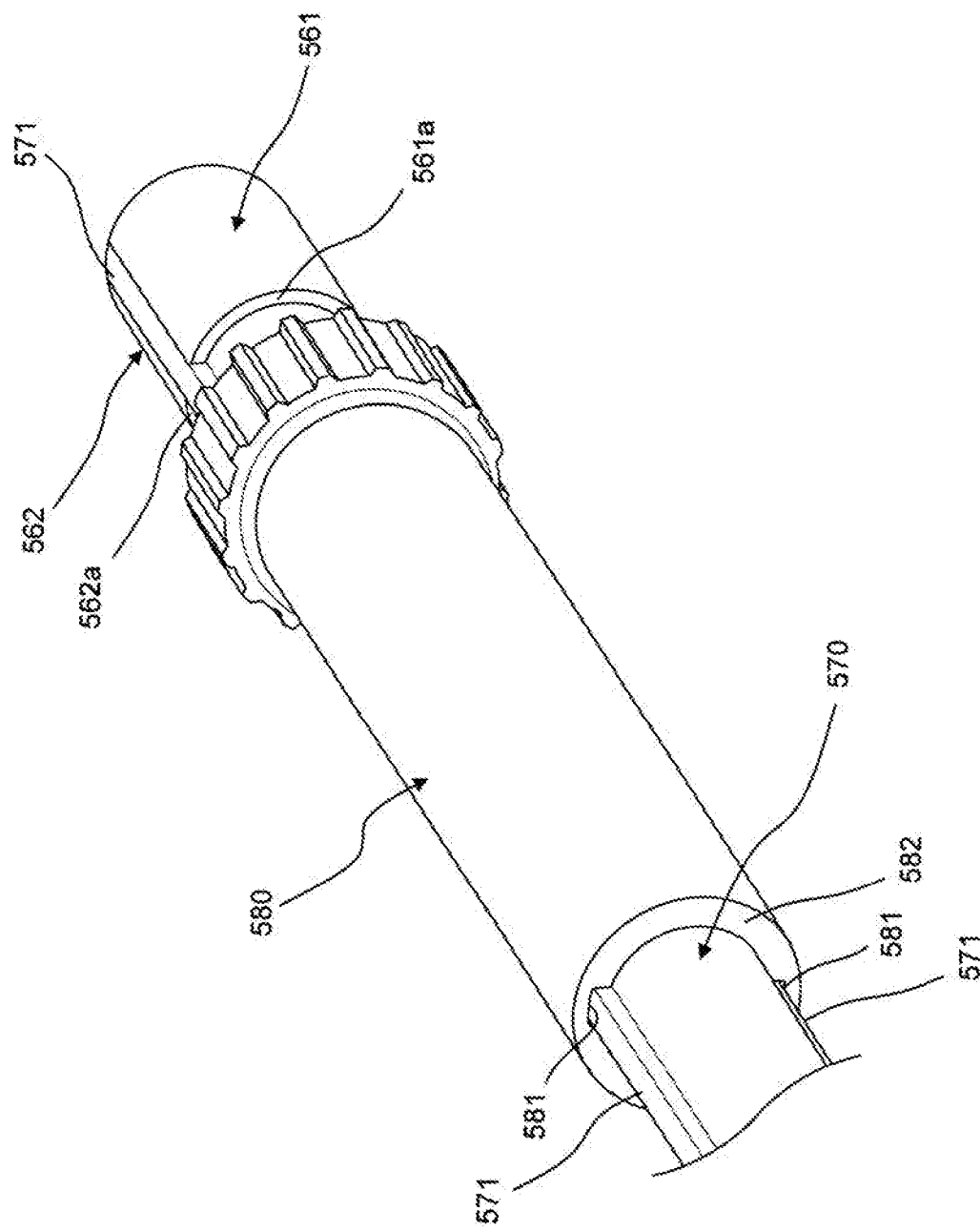
FIG. 20 is a perspective view of the guide tube and the push rod integrally provided with the spindle nut according to the seventh embodiment.

Referring to FIGS. 18 to 20, the spindle drive mechanism in the door opening and closing device for vehicles according to the seventh embodiment includes: the spindle 50 (illustrated in FIG. 2), a spindle nut 560, a push rod 570, and a guide tube 580. The guide tube 580 is cylindrical and is provided on an inner periphery of the cover 12 (illustrated in FIG. 1).

The push rod 570 includes a pair of protrusions 571 provided on its outer periphery, and a hole 572 (illustrated in FIG. 19) configured to connect the spindle nut 560, a semi-cylindrical portion 561, and a semi-cylindrical portion 562. The pair of protrusions 571 are provided at positions radially opposing an outer periphery of the push rod 570 over the entire length of the push rod 570 in the axial direction. As the spindle nut 560, the semi-cylindrical portion 561, and the semi-cylindrical portion 562 are connected via the hole 572, the push rod 570 and the spindle nut 560 are coaxially fixed. In the present embodiment, the spindle nut 560, the semi-cylindrical portion 561, the semi-cylindrical portion 562, which are made of resin, and the push rod 570 made of metal are integrally molded by insert-molding.

Figure 21:
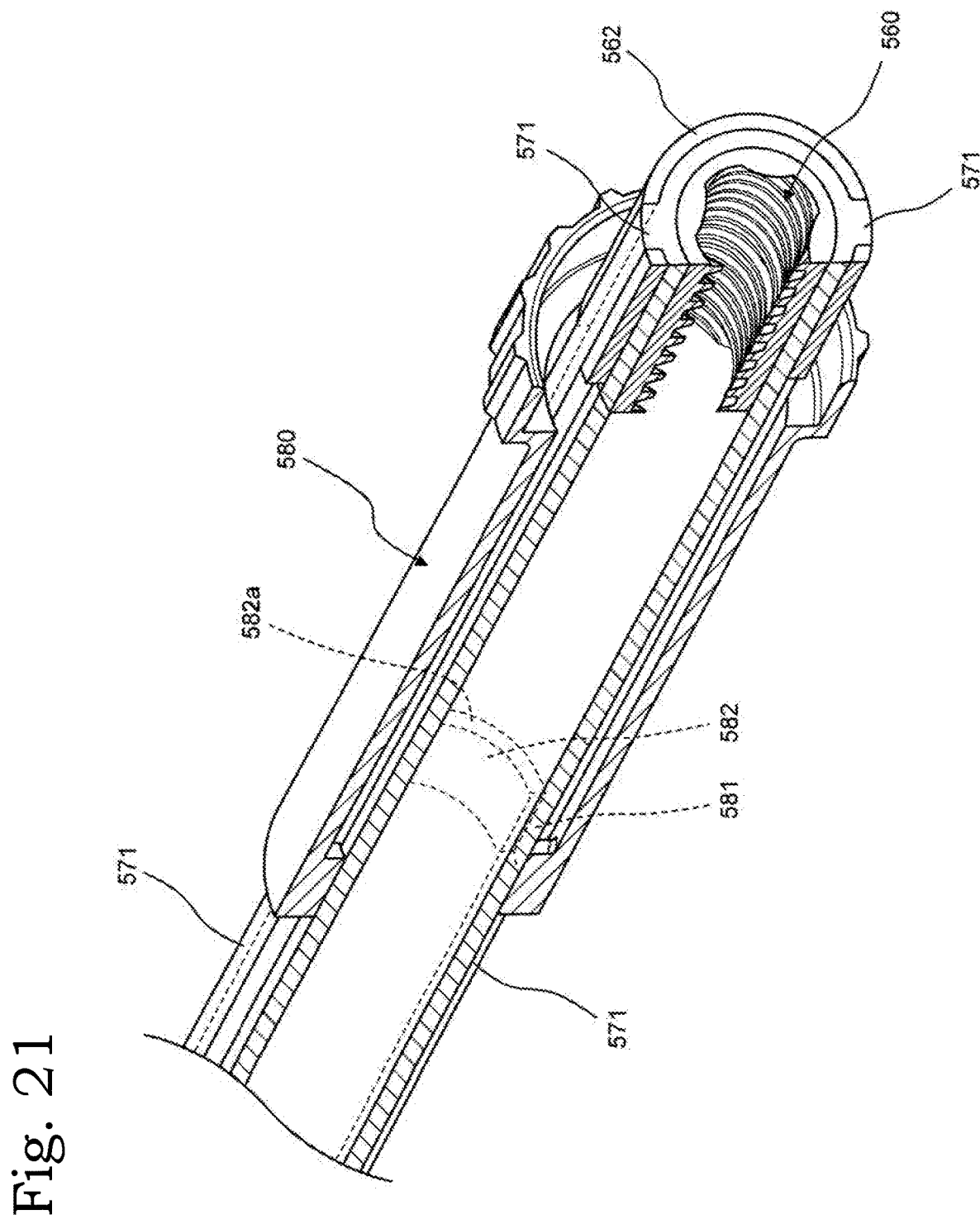
FIG. 21 is a cross-sectional view taken along line XXI-XXI in FIG. 18.

Referring to FIGS. 20 and 21, a locking portion 582 is provided in an annular shape on an inner periphery on a distal end side of the guide tube 580. A pair of guide grooves 581, which guide the protrusion 571 of the push rod 570 in the axial direction, are formed at positions radially opposing the locking portion 582. Note that FIG. 21 is a cross-sectional view taken along line XXI-XXI in FIG. 18.

As the guide groove 581 of the guide tube 580 is engaged with the protrusion 571 of the push rod 570, the push rod 570 is attached to the guide tube 580 so as to be relatively movable in the axial direction, and the relative rotation with respect to the guide tube 580 is restricted. In addition, as a wall surface 561a of the semi-cylindrical portion 561 and a wall surface 562a of the semi-cylindrical portion 562 on the push rod 370 side abut on a locking surface 582a of the locking portion 582 of the guide tube 580, the movement of the push rod 370 in the axial direction is restricted.

In the seventh embodiment, the protrusions 571 provided over the entire length of the push rod 570 in the axial direction at the positions radially opposing the outer periphery of the push rod 570 are engaged with the guide grooves 581 provided in the locking portion 582 of the guide tube 580, so that the push rod 570 is attached to the guide tube 380 so as to be relatively movable in the axial direction, and the relative rotation with respect to the guide tube 580 is restricted.

Note that the pair of protrusions 571 are provided on the outer periphery of the push rod 570 in the seventh embodiment, but one or three or more protrusions may be provided on the outer periphery of the push rod at intervals in the circumferential direction.

The door opening and closing device for vehicles of the present invention is not limited to the configurations of the first to seventh embodiments, and various modifications can be made.

For example, in the first embodiment, the push rod 70 may include an engagement protrusion, and the spindle nut 60 may include an engagement hole within a range that does not affect the thread groove 60a.

In addition, the first housing 10 is not necessarily divided into the accommodating portion 11 and the cover 12.

Eighth Embodiment

Figure 22:
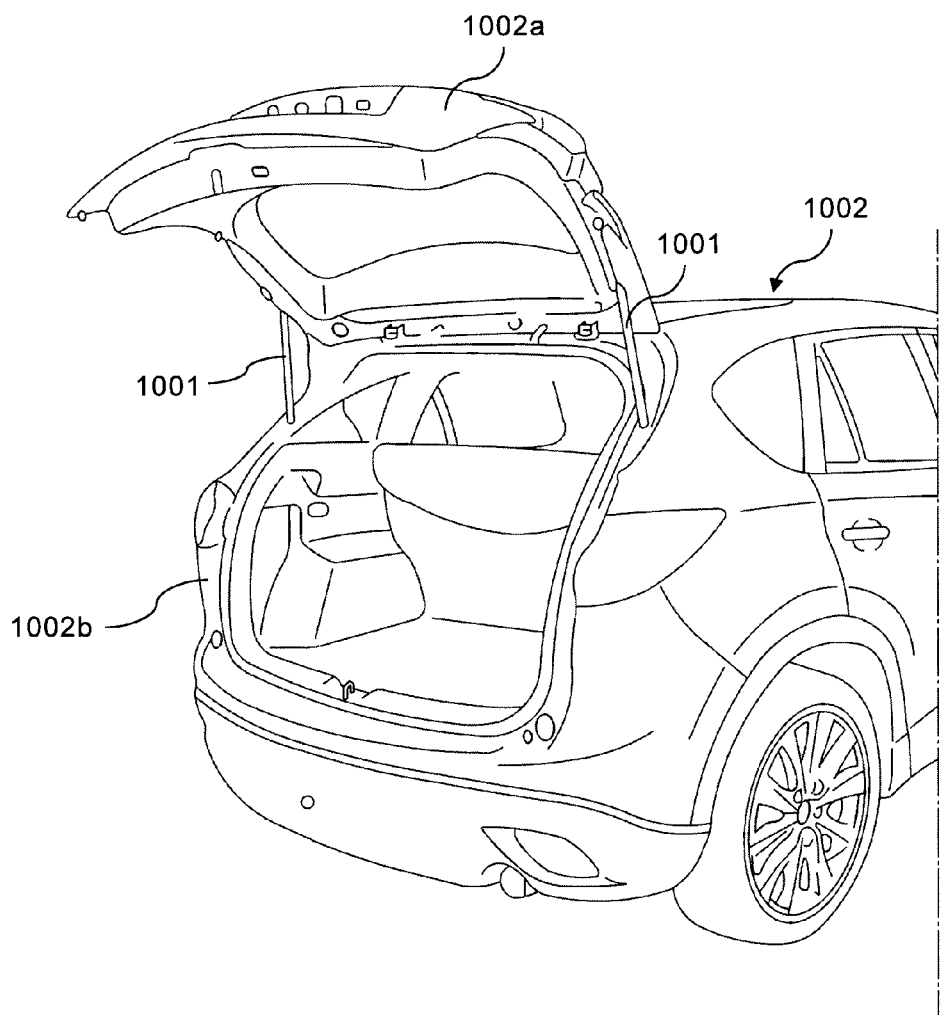
FIG. 22 is a perspective view illustrating a rear portion of a vehicle body in which a door opening and closing device for vehicles according to an eighth embodiment of the present invention is employed.

Referring to FIG. 22, a door opening and closing device 1 for vehicles 1001 according to an eighth embodiment of the present invention has a cylindrical shape, and is connected to a door 1002a and a body 1002b of a vehicle 1002. When the door opening and closing device 1 for vehicles 1001 stretches and contracts, the door 1002a is driven to be open and closed. In the following description, "axial direction", "circumferential direction", and "radial direction" indicate the axial direction, the circumferential direction, and the radial direction of the door opening and closing device 1 for vehicles 1001, respectively.

Figure 23:
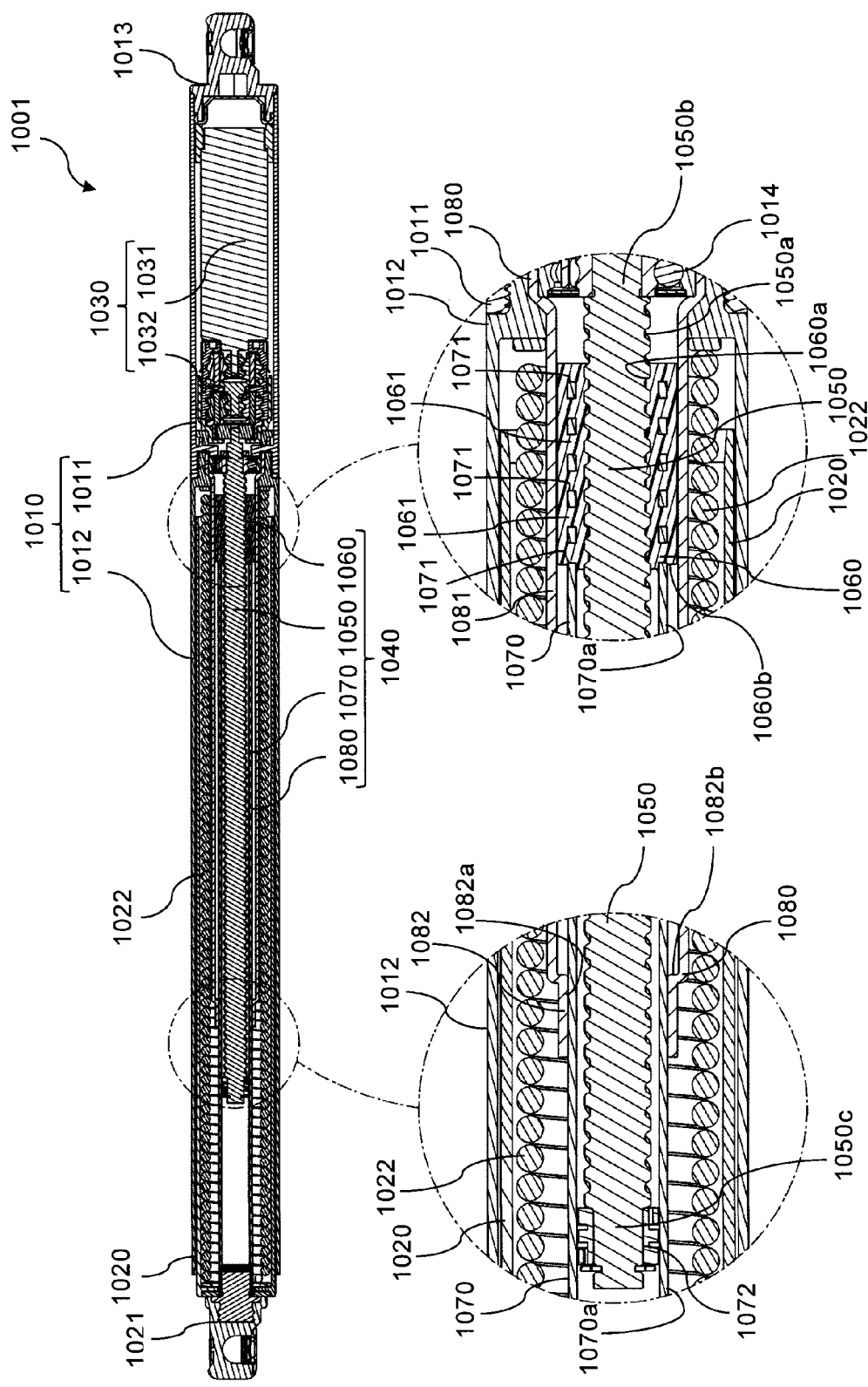
FIG. 23 is a longitudinal cross-sectional view of the door opening and closing device for vehicles according to the eighth embodiment of the present invention.

Referring to FIG. 23, the door opening and closing device 1 for vehicles 1001 according to the present embodiment includes a first housing 1010, a second housing 1020, a motor drive mechanism 1030, and a spindle drive mechanism 1040.

The first housing 1010 includes a cylindrical accommodating portion 1011 that accommodates the motor drive mechanism 1030, and a cylindrical cover 1012 that is screwed and fixed to the accommodating portion 1011. Here, the first housing 1010 may have a structure in which the accommodating portion 1011 and the cover 1012 are integrated. One end (right end in the drawing) of the accommodating portion 1011 in the axial direction is open, and is closed by a shaft end member 1013. The first housing 1010 is connected to the body 1002b of the vehicle 1002 via a ball joint (not illustrated) connected to the shaft end member 1013.

The second housing 1020 is cylindrical, and an outer diameter of the second housing 1020 is smaller than an inner diameter of the first housing 1010. The second housing 1020 is arranged coaxially with the first housing 1010, and is accommodated inside the first housing 1010 so as to be movable relative to the first housing 1010 in the axial direction. One end of the second housing 1020 is closed by a shaft end member 1021. The second housing 1020 is connected to the door 1002a of the vehicle 1002 via a ball joint (not illustrated) connected to the shaft end member 1021. In addition, a coil spring 1022 is arranged coaxially with the second housing 1020 inside the second housing 1020 in the radial direction.

One end (right end in the drawing) of the coil spring 1022 abuts on the first housing 1010, and the other end (left end in the drawing) of the coil spring 1022 abuts on the second housing 1020. The coil spring 1022 is arranged in a compressed state, and elastically biases the first housing 1010 and the second housing 1020 in a direction in which the door opening and closing device 1 for vehicles 1001 stretches.

The motor drive mechanism 1030 includes an electric motor 1031 that is a drive source, and a decelerator 1032 that reduces the rotational speed of the electric motor 1031. The motor drive mechanism 1030 is accommodated inside the accommodating portion 1011 of the first housing 1010.

The spindle drive mechanism 1040 includes a spindle 1050, a spindle nut 1060, a push rod 1070, and a guide tube 1080. The spindle drive mechanism 1040 is arranged inside the coil spring 1022 in the radial direction. Specifically, in the radial direction, the guide tube 1080 is arranged inside the coil spring 1022, and the push rod 1070 is accommodated inside the guide tube 1080. In addition, the spindle nut 1060 is fixed to one end of the push rod 1070. The spindle 1050 is arranged inside the push rod 1070 and the spindle nut 1060 in the radial direction.

As illustrated most clearly in FIG. 23, the spindle 1050 is provided with a thread groove 1050a on its outer peripheral surface. The spindle 1050 is coaxially arranged in the first housing 1010. As illustrated most clearly in FIG. 23, a proximal end 1050b of the spindle 1050 is rotatably supported by a bearing 1014 provided in the first housing 1010. In addition, the spindle 1050 is mechanically connected to a rotating shaft of the electric motor 1031 via the decelerator 1032, and is rotationally driven by the electric motor 1031.

Figure 24:
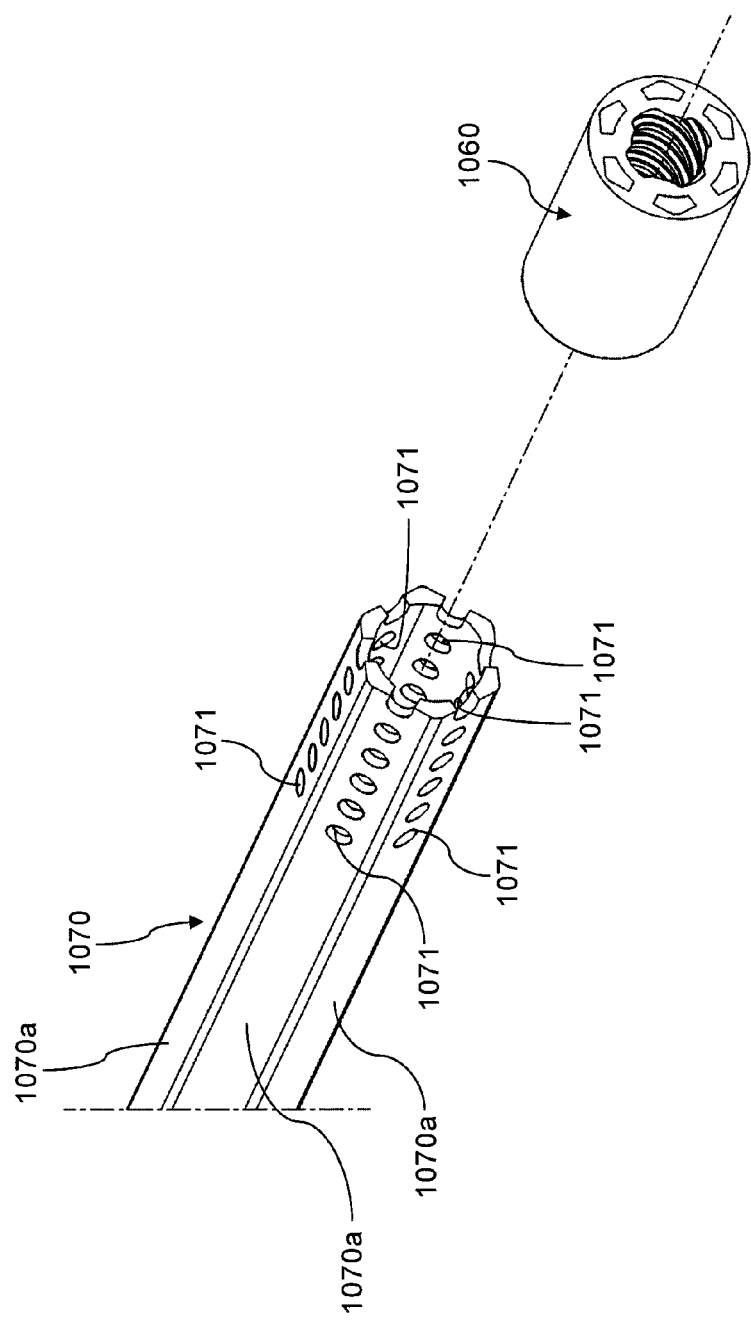
FIG. 24 is an exploded perspective view of a push rod and a spindle nut.

Referring to FIG. 24, the spindle nut 1060 is cylindrical, and has a larger diameter than that of an outer peripheral surface 1070a of the push rod 1070 having a substantially rectangular cylindrical shape which will be described later. Referring also to FIG. 23, a thread groove 1060a is formed on an inner peripheral surface of the spindle nut 1060, and is screwed with the thread groove 1050a provided on the outer periphery of the spindle 1050. The spindle nut 1060 of the present embodiment is made of resin.

The push rod 1070 is substantially rectangular cylindrical, and has a hexagonal outer peripheral surface and a circular inner peripheral surface in a cross section orthogonal to a longitudinal direction of the push rod 1070. Specifically, the push rod 1070 has six outer peripheral surfaces 1070a each of which is a flat surface. A plurality of (five in the illustrated embodiment) through-holes 1071 are formed in each of the outer peripheral surfaces 1070a of the push rod 1070 of the present embodiment. The push rod 1070 is fixed at one end in the axial direction so as not to rotate relative to the spindle nut 1060. In the present embodiment, the spindle nut 1060 made of resin and the push rod 1070 made of metal are integrally molded by insert-molding. As described above, the spindle nut 1060 has the larger diameter than that of the outer peripheral surface 1070a of the push rod 1070, and forms a wall 1060b extending perpendicularly to the axial direction of the push rod 1070 from the outer peripheral surface 1070a of the push rod 1070 in the state fixed to the push rod 1070 as illustrated most clearly in FIG. 23. In addition, as illustrated most clearly in FIG. 23, a resin material of the spindle nut 1060 filling the inside of the through-hole 1071 of the push rod 1070 forms a columnar engagement portion 1061 of the spindle nut 1060 that engages with the through-hole 1071. A resin rotor 1072 that rotatably supports a distal end 1050c of the spindle 1050 on the inner periphery of the push rod 1070 without rattling is provided on the inner periphery of the push rod 1070. The spindle 1050 having both ends supported by the bearing 1014 provided in the first housing 1010 and the resin rotor 1072 provided on the distal end 1050c of the spindle 1050, and is arranged coaxially with the first housing 1010.

Figure 25:
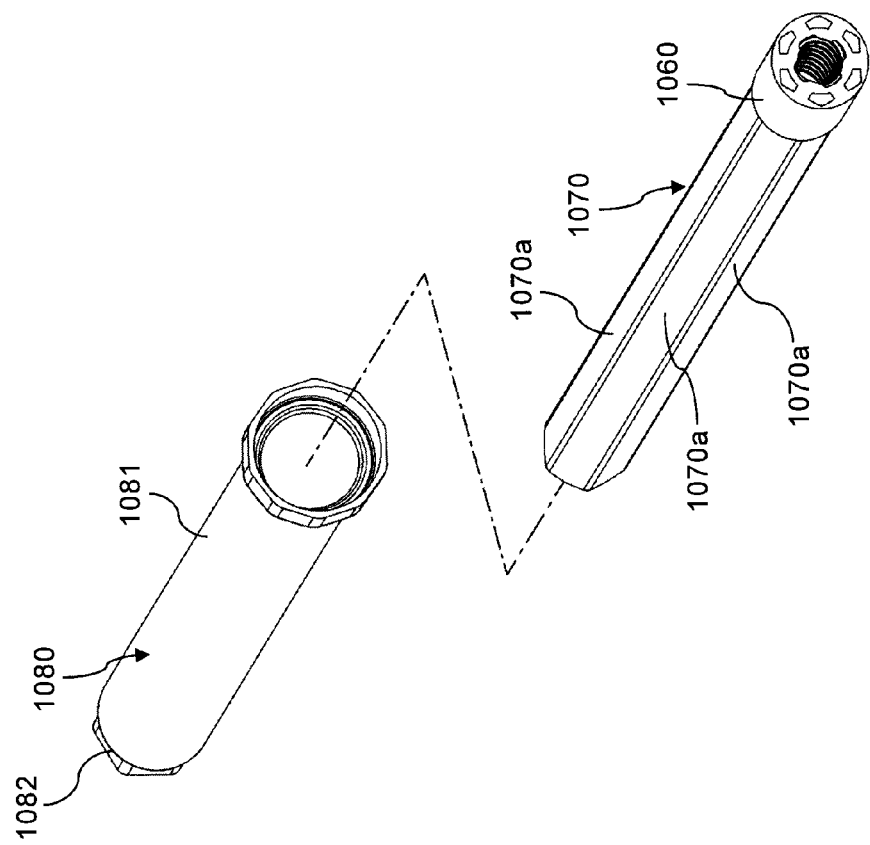
FIG. 25 is an exploded perspective view of a guide tube and the push rod integrally provided with the spindle nut.
Figure 26:
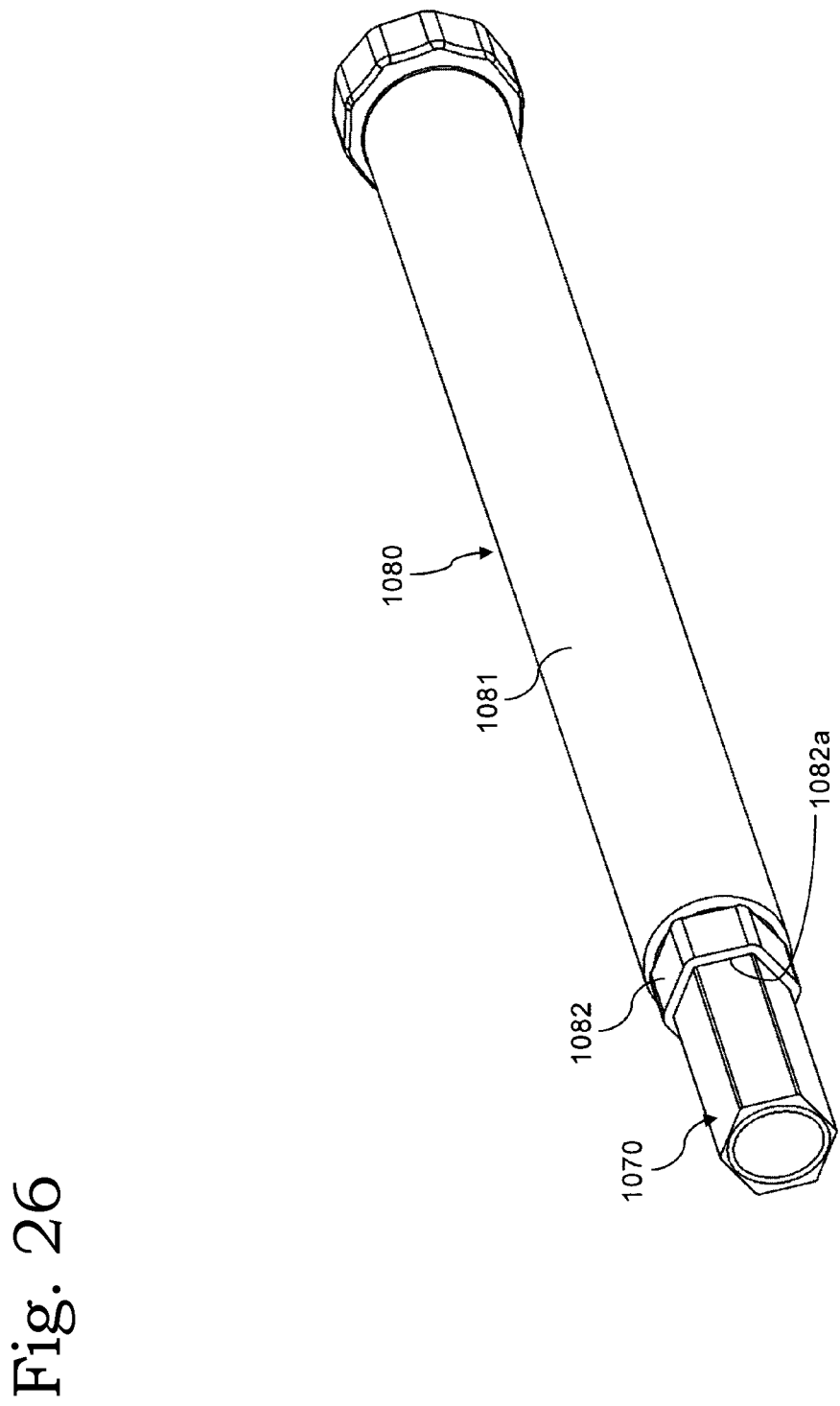
FIG. 26 is a perspective view of the guide tube and the push rod as viewed from the rear side.
Figure 27:
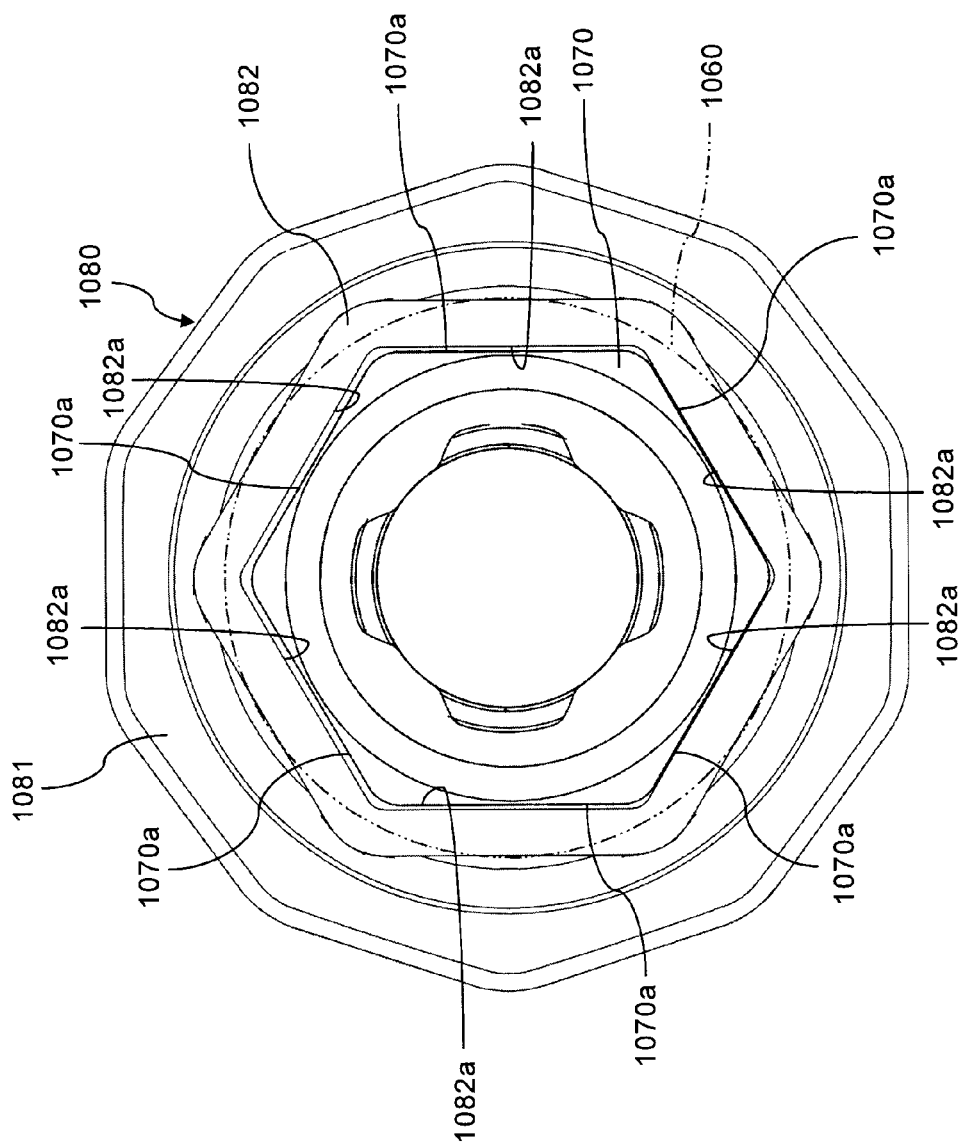
FIG. 27 is a rear view of the guide tube, the push rod, and the spindle nut.
Figure 28:
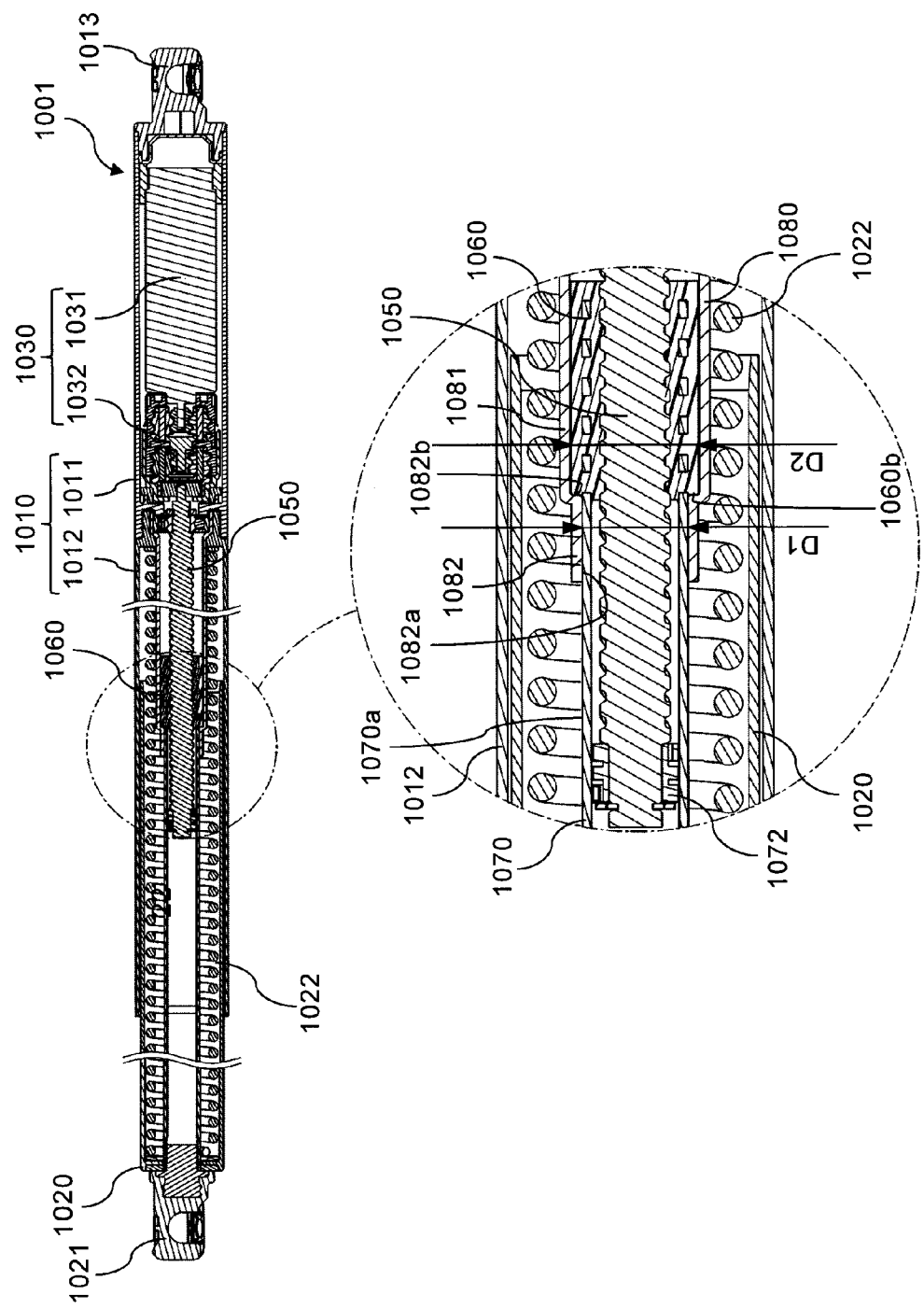
FIG. 28 is a longitudinal cross-sectional view of the door opening and closing device for vehicles in a stretched state.

Referring to FIG. 23, the guide tube 1080 is fixed to the first housing 1010. Referring FIGS. 25 and 26 together, the guide tube 1080 includes a cylindrical main body 1081 and a guide portion 1082 which is provided at one end of the main body 1081 and through which the push rod 1070 is inserted. An inner peripheral surface of the main body 1081 of the guide tube 1080 is circular in a cross section orthogonal to the axial direction. The push rod 1070 is accommodated in the main body 1081 of the guide tube 1080, and the inner peripheral surface of the main body 1081 of the guide tube 1080 opposes the outer peripheral surface 1070a of the push rod with a sufficient interval. Referring to FIG. 27, an inner peripheral surface of the guide portion 1082 has a shape corresponding to the outer peripheral surface 1070a of the push rod 1070 such that the push rod 1070 can slide. In the present embodiment, the inner peripheral surface of the guide portion 1082 is hexagonal in a cross section orthogonal to the longitudinal direction of the guide tube 1080. Specifically, the guide portion 1082 has six inner peripheral surfaces 1082a each of which is a flat surface and opposes the outer peripheral surface 1070a of the push rod 1070. That is, in the cross section orthogonal to the axial direction, the cross-sectional shape of the inner peripheral surface 1082a of the guide portion 1082 is a shape that is similar to and slightly smaller than the cross-sectional shape of the outer peripheral surface 1070a of the push rod 1070. The push rod 1070 is attached to the guide portion 1082 so as to be relatively movable and relatively non-rotatable with respect to the guide tube 1080 by being inserted therethrough. In addition, the guide portion 1082 is formed in accordance with an outer shape of the spindle nut 1060 so as to be capable of locking the spindle nut 1060. Specifically, as illustrated most clearly in FIG. 28, an inner circumferential dimension D1 of the guide portion 1082 is smaller than an outer circumferential dimension D2 of the spindle nut 1060 in the present embodiment. The guide portion 1082 of the guide tube 1080 has a locking surface 1082b that opposes the wall 1060b of the spindle nut 1060 and is perpendicular to the axial direction.

In a state where the door 1002a of the vehicle 1002 is closed, the coil spring 1022 is in the most compressed state in the door opening and closing device 1 for vehicles 1001, and the spindle nut 1060 is located near the proximal end 1050b of the spindle 1050 as illustrated in FIG. 23. When the electric motor 1031 is driven from this state, the rotation of an output shaft of the electric motor 1031 is reduced by the decelerator 1032 and transmitted to the spindle 1050, and the spindle 1050 is rotationally driven. Since the spindle nut 1060 and the push rod 1070 are engaged with the guide tube 1080 and the first housing 1010 so as not to relatively rotate, the rotational movement of the spindle 1050 is converted into the linear movement of the spindle nut 1060 with respect to the guide tube 1080. Specifically, the spindle nut 1060 and the push rod 1070 move in the axial direction along the inner periphery of the guide tube 1080. Along with the movement of the push rod 1070, the second housing 1020 moves relative to the first housing 1010. Since the first housing 1010 and the second housing 1020 relatively move as described above, the door opening and closing device 1 for vehicles 1001 stretches and drives the door 1002a connected via the shaft end member 1021 up to an open position. Here, as illustrated most clearly in FIG. 28, the relative movement of the push rod 1070 with respect to the guide tube 1080 is restricted as the wall 1060b of the spindle nut 1060 and the locking surface 1082b formed on the guide portion 1082 of the guide tube 1080 abut on each other.

The spindle nut 1060 is fixed to the push rod 1070 so as not to rotate relative to the push rod 1070. In addition, since the push rod 1070 is inserted through the guide portion 1082 of the guide tube 1080, the rotational movement of the spindle 1050 is converted into the relative movement of the spindle nut 1060 and the push rod 1070 with respect to the guide tube 1080. For this reason, the relative rotation of the spindle nut 1060 with respect to the guide tube 1080 can be prevented.

In the cross section orthogonal to the axial direction, the cross section of the inner peripheral surface 1082a of the guide portion 1082 of the guide tube 1080 is a polygon that is similar to and slightly smaller than the cross-sectional shape of the outer peripheral surface 1070a of the push rod 1070. For this reason, the relative rotation of the push rod 1070 with respect to the guide tube 1080 can be reliably prevented.

Since the inner peripheral surface of the main body 1081 of the guide tube 1080 opposes the outer peripheral surface 1070a of the push rod 1070 with the interval, the main body 1081 of the guide tube 1080 does not come into contact with the outer peripheral surface 1070a of the push rod 1070 when the push rod 1070 and the guide tube 1080 relatively move. For this reason, a sliding resistance when the push rod 1070 and the guide tube 1080 relatively move can be reduced.

Since the outer circumferential dimension of the spindle nut 1060 is larger than the inner circumferential dimension of the guide portion 1082 of the guide tube 1080, the relative movement between the guide tube 1080 and the push rod 1070 can be restricted by locking the spindle nut 1060 in the axial direction by the guide portion 1082 of the guide tube 1080.

A relative rotation restricting portion is constituted by the outer peripheral surface 1070a of the push rod 1070 whose cross section orthogonal to the longitudinal direction forms the polygon and the inner peripheral surface 1082a of the guide portion 1082 whose cross section orthogonal to the longitudinal direction forms the shape corresponding to the outer peripheral surface 1070a of the push rod 1070.

Since the spindle nut 1060 is molded integrally with the push rod 1070 by insert-molding, it is possible to prevent the spindle nut 1060 from rotating relative to the push rod 1070 and from falling off.

Since the push rod 1070 and the spindle nut 1060 are fixed by the engagement between the through-hole 1071 of the push rod 1070 and the engagement portion 1061 of the spindle nut 1060, the spindle nut 1060 can be prevented from falling off from the push rod 1070.

The door opening and closing device 1 for vehicles 1001 of the present invention is not limited to the configuration of the above embodiment, and various modifications can be made.

For example, the cross-sectional shape of the spindle nut 1060 is not limited to the circle, but may be other shapes such as a polygon. In addition, the inner peripheral surface of the guide tube 1080 may have other shapes such as a polygon, and the outer peripheral surface as well as the inner peripheral surface may have other shapes such as a polygon as long as the wall 1060b of the spindle nut 1060 and the locking surface 1082b provided on the guide portion 1082 of the guide tube 1080 are formed.

In addition, the first housing 1010 is not necessarily divided into the accommodating portion 1011 and the cover 1012.

The invention claimed is:

1. A door opening and closing device for vehicles, comprising:
a motor drive mechanism;
a first housing accommodating the motor drive mechanism;
a spindle drive mechanism connected to the motor drive mechanism; and
a second housing arranged coaxially with the first housing and configured to move relative to the first housing by the spindle drive mechanism,
wherein the spindle drive mechanism includes:
a spindle connected to the motor drive mechanism;
a spindle nut to be screwed with the spindle;
a push rod fixed so as not to rotate relative to the spindle nut;
a guide tube through which the push rod is inserted; and
a relative rotation restricting portion that restricts relative rotation between the push rod and the guide tube;
wherein the relative rotation restricting portion of the spindle drive mechanism comprises:
a protrusion on an outer periphery of the push rod; and
a guide groove formed in the guide tube and configured to guide the protrusion of the push rod in an axial direction; and
wherein the protrusion is at a first end of the push rod, and the spindle nut is arranged within the push rod closer to a second end of the push rod than is the protrusion.

2. The door opening and closing device for vehicles according to claim 1, wherein the protrusion of the push rod is accommodated in the guide groove of the guide tube.

3. The door opening and closing device for vehicles according to claim 1, wherein the spindle nut is insert-molded on the push rod.

4. The door opening and closing device for vehicles according to claim 1, wherein
the spindle nut includes one of an engagement protrusion and an engagement hole,
the push rod includes the other of the engagement protrusion and the engagement hole, and
the engagement protrusion engages with the engagement hole.

5. The door opening and closing device for vehicles according to claim 1, wherein the guide groove of the guide tube includes a locking portion to lock the protrusion in the axial direction.

6. A door opening and closing device for vehicles, comprising:
a motor drive mechanism;
a first housing accommodating the motor drive mechanism;
a spindle drive mechanism connected to the motor drive mechanism; and
a second housing arranged coaxially with the first housing and configured to move relative to the first housing by the spindle drive mechanism,
wherein the spindle drive mechanism includes:
a spindle connected to the motor drive mechanism;
a spindle nut to be screwed with the spindle;
a push rod fixed so as not to rotate relative to the spindle nut;
a guide tube through which the push rod is inserted; and
a relative rotation restricting portion that restricts relative rotation between the push rod and the guide tube;
wherein the guide tube of the spindle drive mechanism has a guide portion through which the push rod is inserted, and
wherein the relative rotation restricting portion of the spindle drive mechanism comprises an outer peripheral surface of the push rod having a cross section orthogonal to a longitudinal direction forming a polygon and an inner peripheral surface of the guide portion having cross section orthogonal to the longitudinal direction forming a shape corresponding to the outer peripheral surface of the push rod.

7. The door opening and closing device for vehicles according to claim 6, wherein a cross section, orthogonal to a longitudinal direction of the guide tube, of the inner peripheral surface of the guide portion forms a polygon corresponding in shape to the polygon formed by the cross section of the outer peripheral surface of the push rod orthogonal to the longitudinal direction of the push rod.

8. The door opening and closing device for vehicles according to claim 6, wherein:
- the guide tube includes a main body having the guide portion on one end side, and
- the main body has an inner peripheral surface opposing the outer peripheral surface of the push rod with an interval.

9. The door opening and closing device for vehicles according to claim 6, wherein an outer circumferential dimension of the spindle nut is larger than an inner circumferential dimension of the guide portion.

10. The door opening and closing device for vehicles according to claim 6, wherein the push rod and the spindle nut are insert-molded.

* * * * *